(12) United States Patent
Nakayama et al.

(10) Patent No.: US 11,524,414 B2
(45) Date of Patent: Dec. 13, 2022

(54) SENSOR UNIT, SENSOR SYSTEM, ROBOT HAND, ROBOT ARM, SERVER DEVICE, CALCULATION METHOD, AND PROGRAM

(71) Applicant: TOYOTA JIDOSHA KABUSHIKI KAISHA, Toyota (JP)

(72) Inventors: Takahiro Nakayama, Nagoya (JP); Yoshiyuki Hata, Nagakute (JP); Motohiro Fujiyoshi, Nagakute (JP); Yoshiteru Omura, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 525 days.

(21) Appl. No.: 16/542,682

(22) Filed: Aug. 16, 2019

(65) Prior Publication Data

US 2020/0070354 A1 Mar. 5, 2020

(30) Foreign Application Priority Data

Aug. 30, 2018 (JP) .............................. JP2018-161407

(51) Int. Cl.
*B25J 13/08* (2006.01)
*G01L 5/165* (2020.01)
*G06F 3/01* (2006.01)

(52) U.S. Cl.
CPC ............ *B25J 13/082* (2013.01); *B25J 13/084* (2013.01); *G01L 5/165* (2013.01); *G06F 3/016* (2013.01)

(58) Field of Classification Search
CPC ........ B25J 13/082; B25J 13/084; B25J 19/02; B25J 15/00; G01L 5/165; G01L 5/228;
(Continued)

(56) References Cited

U.S. PATENT DOCUMENTS 10,564,059 B2* 2/2020 Okada .................... G01L 5/1627
2008/0053247 A1* 3/2008 Sakurai ................... G01L 1/205
73/862.041
(Continued)

FOREIGN PATENT DOCUMENTS

DE  10 2014 221 294 A1  4/2016
EP     1327870 A2 *  7/2003  ............. G01L 5/162
(Continued)

OTHER PUBLICATIONS

JP2016205942A.English.translate, Alexander Schmitz; Sophon Somlor; Richard Hartanto; Sugano Shigeki, Title: MUTI—Axis Force Sensor (Year: 2016).*
(Continued)

*Primary Examiner* — B M M Hannan
(74) *Attorney, Agent, or Firm* — Oblon, McClelland, Maier & Neustadt, L.L.P.

(57) ABSTRACT

A sensor unit includes at least three kinesthetic-sense sensors arranged along a plane, each including a first force-receiving part configured to receive an external force. The sensor unit includes a connecting member including a second force-receiving part configured to receive an external force, configured to transfer the external force received by the second force-receiving part to each first force-receiving part and connecting the first force-receiving parts with each other. The sensor unit includes an output unit configured to output signals corresponding to a pressing force in an orthogonal-axis direction orthogonal to the plane and pressing forces in two axial directions parallel to the plane, respectively, the pressing forces being components of divided forces of the external force received by the second force-receiving part, received by the respective first force-receiving parts through the connecting member.

13 Claims, 17 Drawing Sheets

(58) Field of Classification Search
CPC ......... G01L 1/148; G01L 5/00; G01L 5/0061; G06F 3/016
USPC .......................................... 700/245, 258–260
See application file for complete search history.

(56) References Cited

U.S. PATENT DOCUMENTS

| | | | |
|---|---|---|---|
| 2009/0044639 A1 | 2/2009 | Maekawa | |
| 2011/0005338 A1 | 1/2011 | Okada | |
| 2014/0137670 A1 | 5/2014 | Hata et al. | |
| 2018/0224995 A1* | 8/2018 | Gui | ............ G01L 1/146 |
| 2018/0313866 A1* | 11/2018 | Yamaguchi | ............ G01L 5/228 |
| 2020/0072691 A1* | 3/2020 | Nakayama | ............ G01L 5/165 |
| 2020/0150845 A1* | 5/2020 | Inoue | ............ G06F 3/04142 |

FOREIGN PATENT DOCUMENTS

| | | | | |
|---|---|---|---|---|
| EP | 3457103 A1 * | 3/2019 | ............ | G01L 1/2243 |
| JP | 2008292509 A * | 12/2008 | ............ | G01L 1/26 |
| JP | 2009-210441 A | 9/2009 | | |
| JP | 2011-56601 A | 3/2011 | | |
| JP | 2011-158404 A | 8/2011 | | |
| JP | 4912477 B2 | 4/2012 | | |
| JP | 2013-117458 A | 6/2013 | | |
| JP | 2014-115267 A | 6/2014 | | |
| JP | 2016205942 A * | 12/2016 | ............ | G01L 5/16 |
| JP | 6241982 B1 * | 12/2017 | ............ | G01L 1/14 |
| JP | 6257017 B1 | 1/2018 | | |
| JP | 2018063263 A * | 4/2018 | ............ | G01L 1/22 |
| JP | 2018185296 A * | 11/2018 | ............ | G01L 1/18 |
| JP | 2019012013 A * | 1/2019 | ............ | B25J 13/085 |
| JP | 2019056684 A * | 4/2019 | ............ | G01L 1/2243 |
| WO | WO-2016170848 A1 * | 10/2016 | ............ | G01L 5/16 |
| WO | WO 2017-212818 A1 | 12/2017 | | |
| WO | WO-2018066557 A1 * | 4/2018 | ............ | G01L 1/22 |
| WO | WO-2019044653 A1 * | 3/2019 | ............ | B25J 13/082 |

OTHER PUBLICATIONS

JP2016205942.Abstract, Alexander Schmitz; Sophon Somlor; Richard Hartanto; Sugano Shigeki, Title: MUTI—Axis Force Sensor (Year: 2016).*

JP2019056684A.English.translate, Title: Force Sensor Device (Year: 2019).*

* cited by examiner

SENSOR UNIT, SENSOR SYSTEM, ROBOT HAND, ROBOT ARM, SERVER DEVICE, CALCULATION METHOD, AND PROGRAM

CROSS REFERENCE TO RELATED APPLICATIONS

This application is based upon and claims the benefit of priority from Japanese patent application No. 2018-161407, filed on Aug. 30, 2018, the disclosure of which is incorporated herein in its entirety by reference.

BACKGROUND

The present disclosure relates to a sensor unit, a sensor system, a robot hand, a robot arm, a server device, a calculation method, and a program.

Developments of a kinesthetic-sense sensor that detects pressures in a plurality of axial directions and moments around a plurality of axes have been underway.

In a measurement apparatus disclosed in Japanese Unexamined Patent Application Publication No. 2011-158404, three reaction-force sensors are attached to respective places of each of sensor units disposed on a heel side and a toe side, respectively, of a subject's foot. Then, forces in the three axial directions orthogonal to each other and moments around these axes are measured by these reaction-force sensors. Each of the reaction-force sensors includes a plurality of strain gauges.

A mechanical-quantity MEMS sensor disclosed in Japanese Unexamined Patent Application Publication No. 2014-115267 includes a force receiving part that receives forces in first and second directions, and a seesaw part that rotates in a first rotational direction according to the force in the first direction received by the receiving part and rotates in the first rotational direction according to a mechanical quantity in the second direction received by the receiving part. Further, the mechanical-quantity sensor includes a seesaw part that rotates in a second rotational direction according to the mechanical quantity in the first direction received by the receiving part and rotates in a direction opposite to the second rotational direction according to the mechanical quantity in the second direction received by the receiving part.

SUMMARY

Incidentally, a kinesthetic-sense sensor that detects pressures in a plurality of axial directions and moments around a plurality of axes has been expected to be use for tactile sensors such as those of robot hands. However, when a strain gauge is used as in the technique disclosed in Japanese Unexamined Patent Application Publication No. 2011-158404, it is necessary to increase the size of a flexure element in order to increase a resolution, thus increasing the size of the sensor unit itself. Meanwhile, regarding the mechanical-quantity sensor disclosed in Japanese Unexamined Patent Application Publication No. 2014-115267, it is difficult to appropriately detect mechanical quantities in three or more axial directions by using the mechanical-quantity sensor alone.

The present disclosure has been made to solve the above-described problem and an object thereof is to provide, for example, a six-axis sensor unit capable of reducing its size and thickness, and coping with a desired area.

A first exemplary aspect is a sensor unit including at least three kinesthetic-sense sensors arranged along a plane, each of the kinesthetic-sense sensors including a first force receiving part configured to receive an external force. The sensor unit includes a connecting member including a second force receiving part configured to receive an external force, the connecting member being configured to transfer the external force received by the second force receiving part to each of the first force receiving parts and connecting the first force receiving parts with each other. The sensor unit includes an output unit configured to output signals corresponding to a pressing force in an orthogonal-axis direction orthogonal to the plane and pressing forces in two axial directions parallel to the plane, respectively, the pressing forces being components of divided forces of the external force received by the second force receiving part, received by the respective first force receiving parts through the connecting member.

By the above-described configuration, the sensor unit can transfer the divided forces of the pressing force and the moment received by the second force receiving part to the kinesthetic-sense sensors. The kinesthetic-sense sensors output the signals corresponding to the pressing forces for their respective received divided forces.

According to the present disclosure, it is possible to provide, for example, a six-axis sensor unit capable of reducing its size and thickness.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

For clarifying the explanation, the following description and the drawings are partially omitted and simplified as appropriate. The same symbols are assigned to the same elements throughout the drawings and duplicated explanations are omitted as appropriate.

First Embodiment

Figure 1:
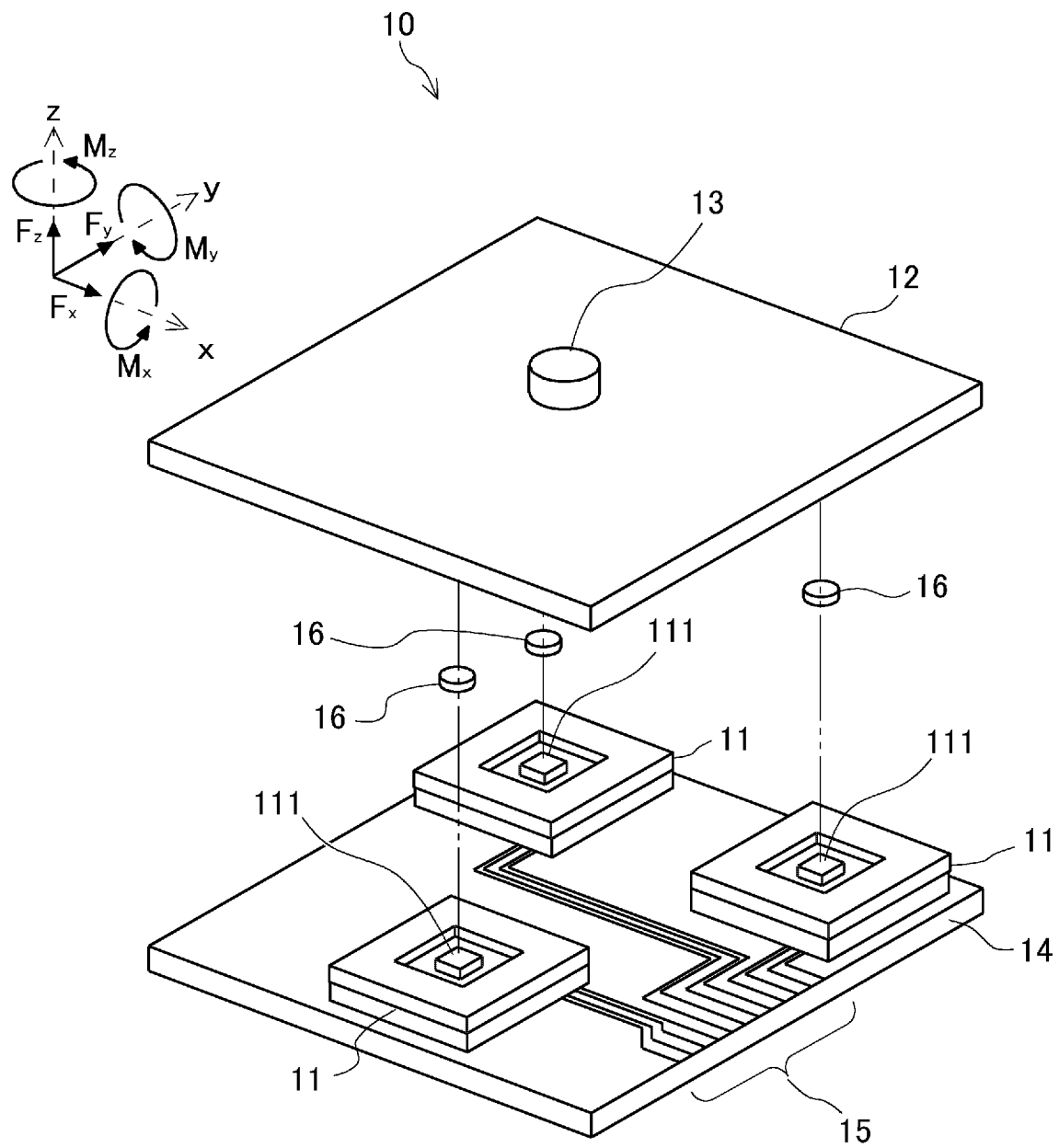
FIG. 1 is an exploded perspective view of a sensor unit according to a first embodiment.

A first embodiment according to the present disclosure is explained hereinafter with reference to the drawings. FIG. 1 is an exploded perspective view of a sensor unit according to the first embodiment. Note that for the sake of explaining a positional relation among components, a right-handed orthogonal coordinate system is shown in FIG. 1. Further, in FIG. 2 and subsequent figures, when an orthogonal coordinate system is shown, x-, y- and z-axis directions in the orthogonal coordinate system coincide with those of the coordinate system shown in FIG. 1.

A sensor unit 10 shown in FIG. 1 detects a pressing force Fx in the x-axis direction, a pressing force Fy in the y-axis direction, a pressing force Fz in the z-axis direction, a moment Mx around the x-axis, a moment My around the y-axis, and a moment Mz around the z-axis, and outputs these detected values. Note that in the present disclosure, the x-, y- and z-axes are also collectively referred to as three axes. The pressing forces in the three axial directions mean three pressing forces in the respective three axial directions. The moments around the three axes mean three moments around the respective three axes. The sensor unit 10, which is shown as an example of a sensor unit in FIG. 1, includes, as its main components, kinesthetic-sense sensors 11, a connecting plate 12, and a substrate 14.

Each of the kinesthetic-sense sensors 11 is a sensor that receives an external force transferred from a second force receiving part 13, and is an MEMS (Micro Electro Mechanical Systems) sensor that is constructed by using an MEMS technique. Details of the function of the kinesthetic-sense sensor 11 will be described later. The kinesthetic-sense sensors 11 are arranged in the sensor unit 10 in the following manner. Three kinesthetic-sense sensors 11 are arranged along a main surface of the substrate 14. Each of the kinesthetic-sense sensors 11 includes, on its surface opposite to its surface disposed on (i.e., attached to) the substrate 14 (i.e., its surface on the z-axis positive side), a first force receiving unit 111 that receives an external force. The three first force receiving units 111 are connected to the connecting plate 12 through connecting parts 16. Each of the connecting parts 16 is a member for connecting the respective first receiving unit 111 with the connecting plate 12. For example, each of the connecting parts 16 is an adhesive material.

The connecting plate 12 is formed of a flexible plate-like member. Examples of the material for the connecting plate 12 include silicon, elastomer, polyethylene terephthalate, polycarbonate, and metals. The connecting plate 12 has a function of transferring divided forces of an external force received by the sensor unit 10 to the kinesthetic-sense sensors 11. Therefore, the connecting plate 12 can be regarded as a connecting member connected to each of the three kinesthetic-sense sensors 11. The connecting plate 12 includes, on its z-axis positive side, the second force receiving part 13 that receives an external force.

The second force receiving part 13 has a function of receiving an external force and transferring the received external force to the first force receiving parts. That is, the second force receiving part serves as a point where a force is applied to the sensor unit (hereinafter referred to as the force-applied point in the sensor unit). In FIG. 1, the second force receiving part is vertically disposed in a columnar shape at the center of the main surface of the connecting plate 12 on the z-axis positive side. The second force receiving part may be made of the same material as that for the connecting plate 12. In this case, the second force receiving part may be integrally formed with the connecting plate 12.

Note that each of the connecting parts 16 includes a material having a predetermined thickness in order to provide a gap between the respective first force receiving unit 111 and the connecting plate 12. In this case, the material having the predetermined thickness may be, for example, a resin such as polycarbonate or polyethylene terephthalate, or may be a metal such as aluminum. By forming the connecting parts 16 with the predetermined thickness, it is possible to prevent a collision between the kinesthetic-sense sensors 11 and the connecting plate 12 when a pressing force is applied in the z-axis negative direction of the kinesthetic-sense sensors 11. Note that the connecting parts 16 may be formed of the same material as that for the connecting plate 12. In this case, the connecting part 16 may be integrally formed with the connecting member.

The substrate 14 is a flat substrate disposed in parallel with the xy-plane and is formed of, for example, a semiconductor substrate containing silicon as its main component. The substrate 14 supports the kinesthetic-sense sensors 11 and has an output unit 15 for outputting (signals corresponding to) pressing forces received by the sensor unit 10. The output unit 15 consists of, for example, terminals formed on the substrate 14 and made of a metal foil, a metal plate, etc.

Figure 2:
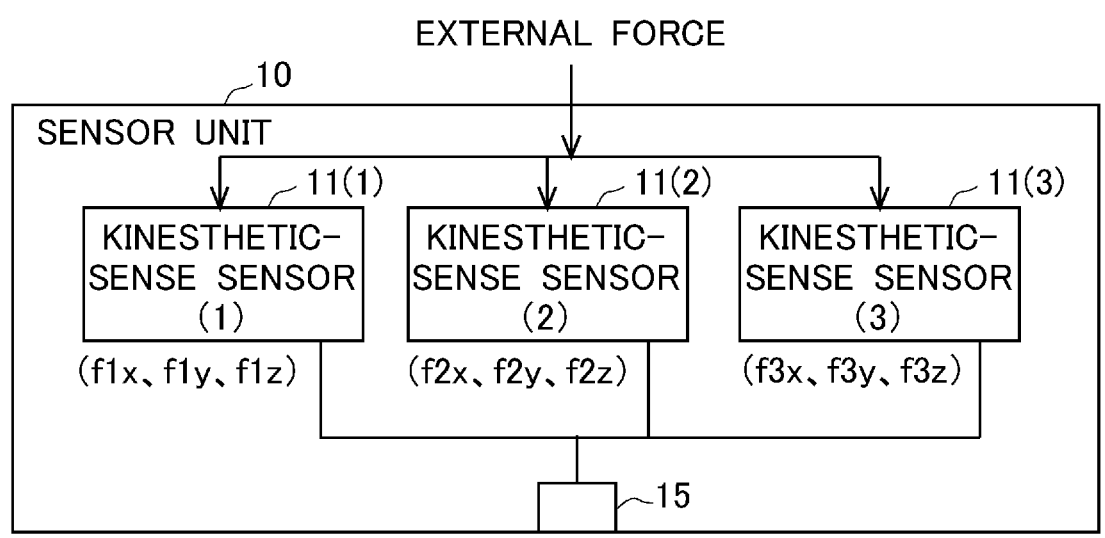
FIG. 2 is a functional block diagram of the sensor unit according to the first embodiment.

Next, a function of the sensor unit 10 will be explained with reference to FIG. 2. FIG. 2 is a functional block diagram of the sensor unit according to the first embodiment. The sensor unit 10 includes three kinesthetic-sense sensors 11(1) to 11(3). Each of the kinesthetic-sense sensors 11(1) to 11(3) receives a divided force according to an external force. The kinesthetic-sense sensor 11(1) detects pressing forces ($f1x$, $f1y$, $f1z$) in three axial directions according to the received divided force. Similarly, the kinesthetic-sense sensor 11(2) detects pressing forces (f2x, f2y, f2z) in the three axial directions according to the received divided force. The kinesthetic-sense sensor 11(3) has a function similar to those of the kinesthetic-sense sensors 11(1) and 11(2). Further, the output unit 15 externally outputs signals corresponding to the pressing forces detected by the kinesthetic-sense sensors 11(1) to 11(3).

Figure 3:
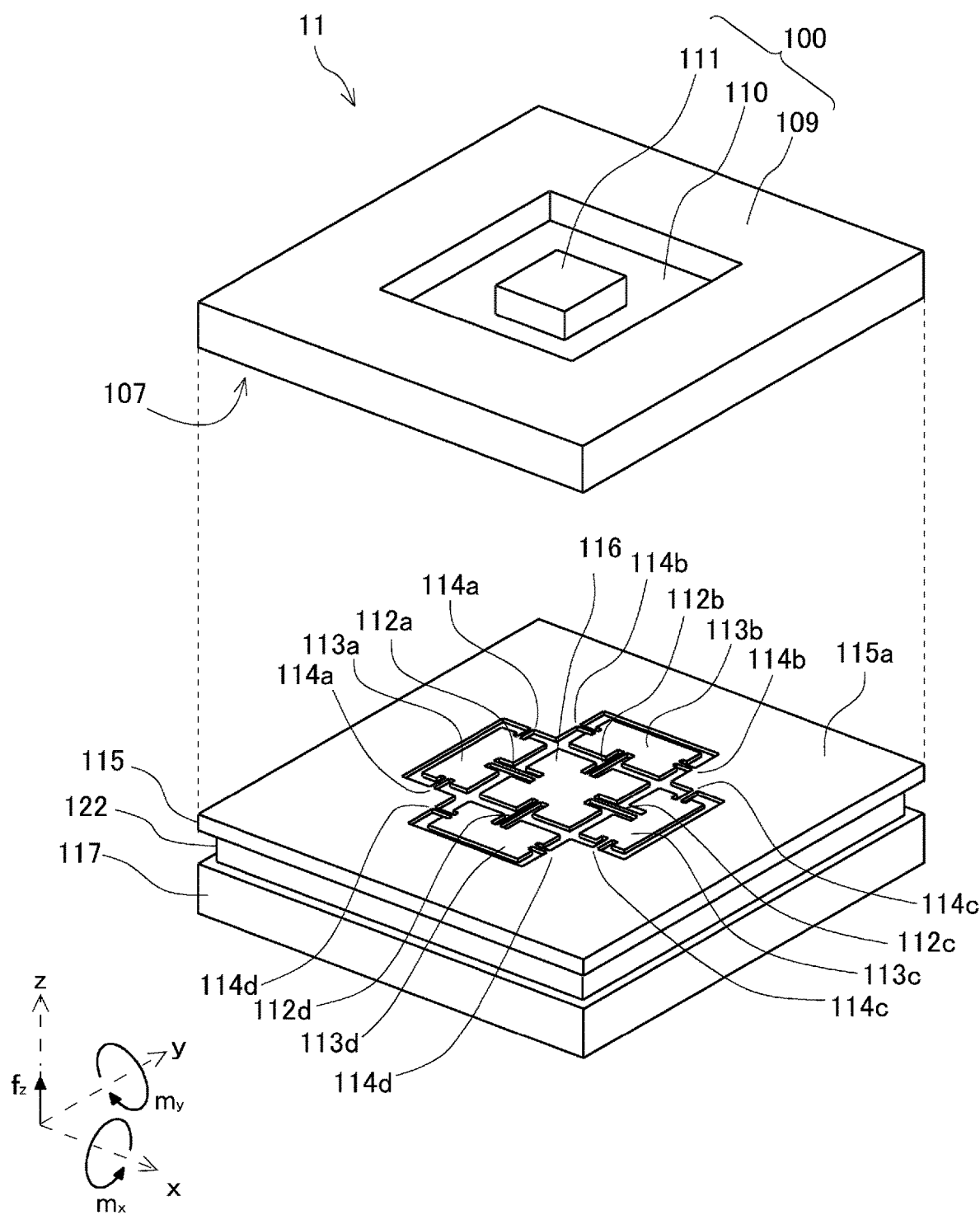
FIG. 3 is a perspective view of a kinesthetic-sense sensor as viewed from a z-axis positive side.
Figure 4:
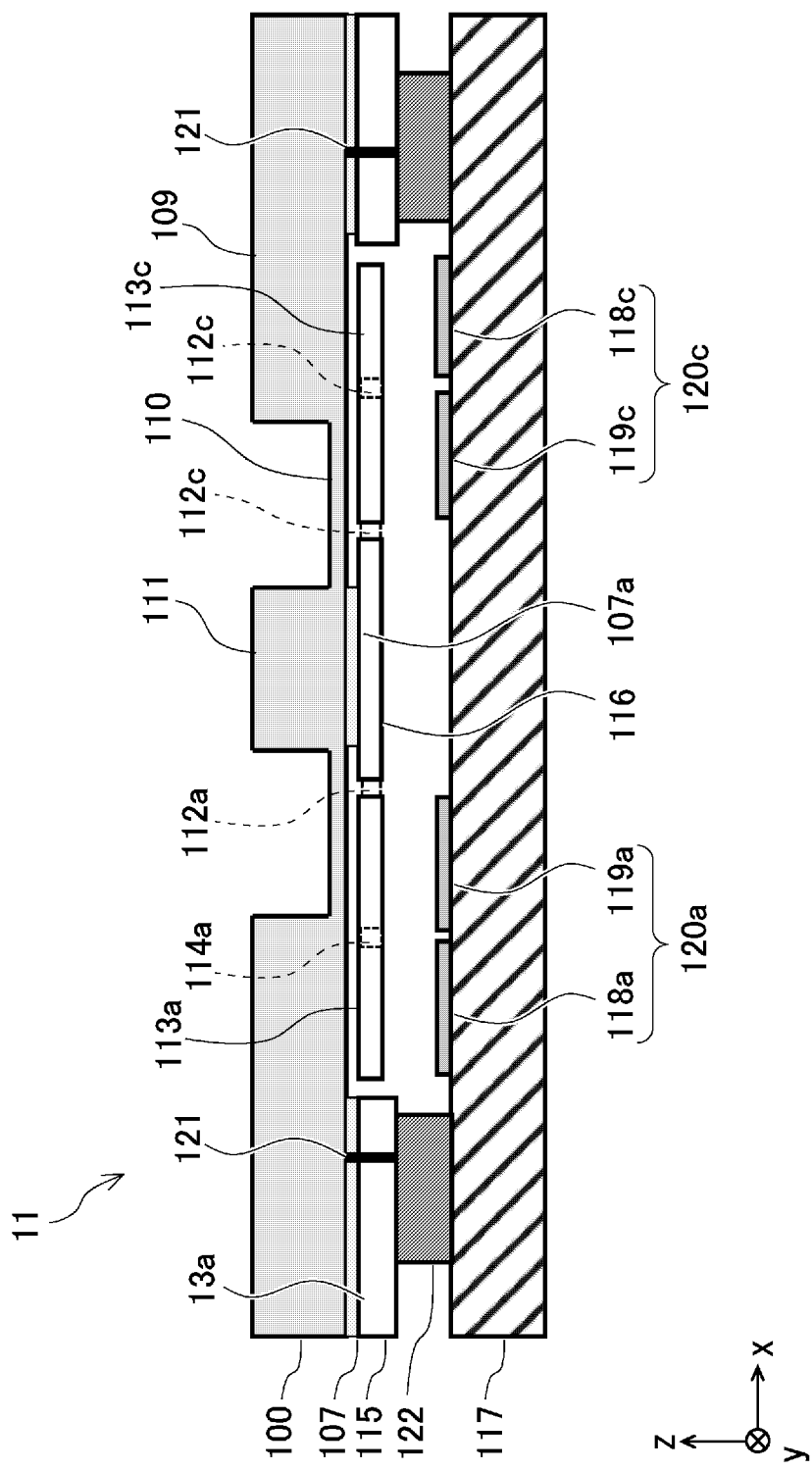
FIG. 4 is a cross section of the kinesthetic-sense sensor as viewed from an xz-plane.

Next, a kinesthetic-sense sensor 11 used for the unit sensor 10 according to the first embodiment is described with reference to FIGS. 3 and 4. FIG. 3 is an exploded perspective view of the kinesthetic-sense sensor 11 as viewed from the z-axis positive side. FIG. 4 is a cross section of the kinesthetic-sense sensor 11 as viewed from the xz-plane. The kinesthetic-sense sensor 11 has a quadrangular-prism shape with its surface perpendicular to the z-axis being a main surface. Further, the main surface is roughly square. The kinesthetic-sense sensor 11 is a capacitance-type sensor that outputs (signals corresponding to) pressing forces in the three axial directions. That is, the kinesthetic-sense sensor 11 includes a plurality of electrodes. The structure of the electrodes will be described later. The kinesthetic-sense sensor 11 includes, as its main components, a first silicon layer 100, a second silicon layer 115, a bonding part 122, and a sealing substrate 117.

The first silicon layer 100 also serves as a support substrate that supports a seesaw part (which will be described later). Further, the first silicon layer 100 is a conductive silicon layer. The first silicon layer 100 includes a diaphragm 110 formed in a central part of its rear surface. Further, a first force receiving part 111, which is formed in the form of a protrusion, is formed in a central part on the inner side of the diaphragm 110. Similarly to the outer shape of the first silicon layer 100, each of the diaphragm 110 and the first force receiving part 111 has a roughly square shape on the plan view. The diaphragm 110 is a thin part having a thickness smaller than that of a peripheral part 109 of the first silicon layer 100. Further, the diaphragm 100 is flexible and elastically deforms according to a force applied to the first force receiving part 111. The first silicon layer 100 originally has a predetermined thickness. Then, by etching a central part of the first silicon layer 100 except for the first force receiving part 111 from the Z-axis positive side and thereby reducing the thickness of that part, the diaphragm 110 is formed in the first silicon layer 100. Note that the first force receiving part 111 may have a thickness equal to that of the peripheral part 109, or a thickness larger than that of the peripheral part 109. The first force receiving part 111 is configured so that, by connecting the connecting parts 16 shown in FIG. 1 onto its upper surface, it does not interfere with movements of the connecting plate 12.

In the second silicon layer 115, which is located on the lower-surface side of the first silicon layer 100, a force receiving piece 116 is formed in its central part and four seesaw parts 113a to 113d are formed around the force receiving piece 116. The seesaw parts 113a and 113c are disposed on both sides of the force receiving piece 116 in the x-axis direction, and the seesaw parts 113b and 113d are disposed on both sides of the force receiving piece 116 in the y-axis direction. The force receiving piece 116 is connected to the seesaw parts 113a to 113d through hinge beams 112a to 112d, respectively (each of them is also referred to as a hinge beam 112).

The second silicon layer 115 originally has a predetermined thickness. Then, by etching it, the force receiving piece 116, the seesaw parts 113a to 113d, the hinge beams 112a to 112d, etc. are formed in the second silicon layer 115. Similarly to the first silicon layer 100, the second silicon layer 115 is a conductive silicon layer. Further, the whole of the force receiving piece 116, the seesaw parts 113a to 113d, the hinge beams 112a to 112d, etc. are conductive and electrically connected to each other.

An insulating layer 107 is disposed between the first silicon layer 100 and the second silicon layer 115. The insulating layer 107 is processed by sacrificial etching and thereby joins a peripheral part 115a of the second silicon layer 115 with the first silicon layer 100. Further, the insulating layer 107 joins the first force receiving part 111 with the force receiving piece 116.

A torsion beam 114a extends in parallel and coaxially with the y-axis from each of both sides of the seesaw part 113a on the y-axis positive and negative sides. A torsion beam 114b extends in parallel and coaxially with the x-axis from each of both sides of the seesaw part 113b on the x-axis positive and negative sides. A torsion beam 114c extends in parallel and coaxially with the y-axis from each of both sides of the seesaw part 113c on the y-axis positive and negative sides. A torsion beam 114d extends in parallel and coaxially with the x-axis from each of both sides of the seesaw part 113d on the x-axis positive and negative sides. The seesaw parts 113a to 113d are connected to the peripheral part 115a through the torsion beams 114a to 114d, respectively. The torsion beams 114a to 114d are formed as beam structures so that they can be twisted. Therefore, the seesaw parts 113a to 113d are supported so that they can rotate by using the torsion beams 114a to 114d, by which the seesaw parts 113a to 113d are respectively supported, as their rotation axes. The torsion beams 114a to 114d may also be referred to as the rotational axes of the seesaw parts 113a to 113d, respectively.

The second silicon layer 115 includes the peripheral part 115a formed around the seesaw parts 113a to 113d. The peripheral part 115a supports, by being connected to the torsion beams 114a to 114d, the seesaw parts 113.

On the x-axis negative side of the force receiving piece 116, the opposed sides of the force receiving piece 116 and the seesaw part 113a are connected to each other at their central parts through the hinge beam 112a. On the y-axis positive side of the force receiving piece 116, the opposed sides of the force receiving piece 116 and the seesaw part 113b are connected to each other at their central parts through the hinge beam 112b. On the x-axis positive side of the force receiving piece 116, the central parts of the opposed sides of the force receiving piece 116 and the seesaw part 113c are connected to each other through the hinge beam 112c. On the y-axis negative side of the force receiving piece 116, the central parts of the opposed sides of the force receiving piece 116 and the seesaw part 113d are connected to each other through the hinge beam 112d. The hinge beams 112a and 112c are disposed in parallel and coaxially with the x-axis. The hinge beams 112b and 112d are disposed in parallel and coaxially with the y-axis. The hinge beams 112a to 112d are formed as beam structures so that they can be warped and twisted, and they extend perpendicular to the rotation axes formed by the torsion beams 114a to 114d, respectively.

By the above-described configuration, the force receiving piece 116 is supported so that it can rotate by using the hinge beams 112a and 112c as its rotation axis. Further, the force receiving piece 116 is supported so that it can rotate by using the hinge beams 112b and 112d as its rotation axis. Further, the force receiving piece 116 is supported so that it can be displaced in parallel to the z-axis direction. In other words, the force receiving piece 116 follow and move in the z-axis direction, around the x-axis, and around the y-axis according to an external force received by the first force receiving part 111. Further, the first force receiving part 111 transfers the external force to the seesaw parts 113a to 113d. When the seesaw parts 113a to 113d are displaced in the rotational direction by the transferred external force, the kinesthetic-sense sensor 11 outputs (signals corresponding to) pressing forces in the three axial directions that the kinesthetic-sense sensor 11 has received.

Through electrodes 121 are formed in the peripheral part 115a of the second silicon layer 115, which are located on the outer sides of the seesaw parts 113a to 113d. The through electrodes 121 penetrate the second silicon layer 115 and the insulating layer 107, and electrically connect the first silicon layer 100, the second silicon layer 115, and the bonding part 122 with one another. The bonding part 122 seals and joins the second silicon layer 115 and the sealing substrate 117 in the peripheral part of the kinesthetic-sense sensor 11 so as to surround the seesaw parts 113 and the force receiving piece 116. The bonding part 122 is a conductive metal diffusion joining member and is made of, for example, a Cu—Sn (copper-tin) alloy or the like.

The sealing substrate 117 is a substrate that seals the whole moveable part including the seesaw parts 113a to 113d and the force receiving piece 116. The sealing substrate 117 may be, for example, a silicon substrate, an LTCC (Low Temperature Co-fired Ceramic) substrate, an LSI (Large Scale Integration), or the like. For example, vias (not shown) that draw out an electric potential at electrodes located on the upper-surface side of the sealing substrate 117 to the lower-surface side thereof are disposed in the sealing substrate 117. Further, external terminals (not shown) connected to these vias are disposed on the rear surface (i.e., the lower-surface side) of the sealing substrate 117 and an external detection circuit or the like is connected to these external terminals. Further, circuits such as a detection circuit and wiring lines are disposed as required inside the sealing substrate 117. The sealing substrate 117 is preferably formed by an LSI. In this way, a processing circuit can be disposed near the sensor structure, thereby making the sensor less susceptible to noises.

Fixed electrode pairs 120a to 120d are formed on the upper-surface side of the sealing substrate 117. The fixed electrode pair 120a includes fixed electrodes 118a and 119a. Similarly, the fixed electrode pair 120b includes fixed electrodes 118b and 119b, and the fixed electrode pair 120c includes fixed electrodes 118c and 119c. Further, the fixed electrode pair 120d includes fixed electrodes 118d and 119d.

The fixed electrodes 118a to 118d and 119a to 119d are conductive films such as metal and are formed on the sealing substrate 117 by patterning. The fixed electrodes 118a to 118d and 119a to 119d are disposed at positions corresponding to the seesaw parts 113a to 113d, respectively, and constitute capacitive elements with the seesaw parts 113a to 113d. The fixed electrodes 118a to 118d are disposed on the outer side with respect to the rotational axes (the torsion beams 114a to 114d) of the seesaw parts 113a to 113d, and the fixed electrodes 119a to 119d are disposed on the inner side. For example, capacitances of these capacitive elements can be detected by an external detection circuit or the like through the vias (not shown) disposed in the sealing substrate 117, or by an LSI formed inside the sealing substrate 117.

Figure 5A:
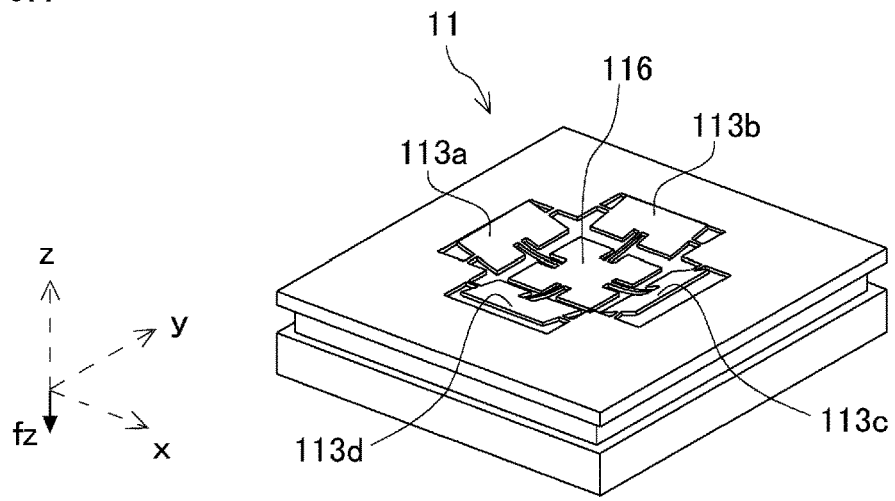
FIG. 5A is a perspective view for explaining a motion of a kinesthetic-sense sensor.
Figure 5B:
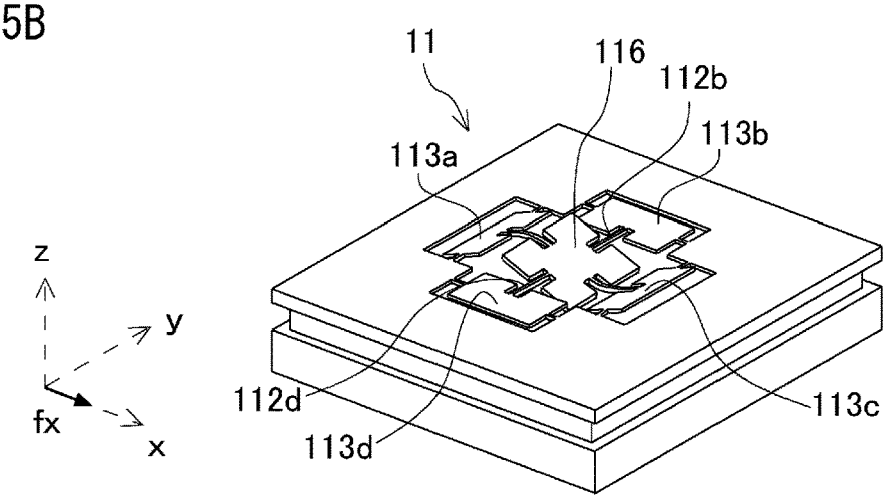
FIG. 5B is a perspective view for explaining a motion of a kinesthetic-sense sensor.
Figure 5C:
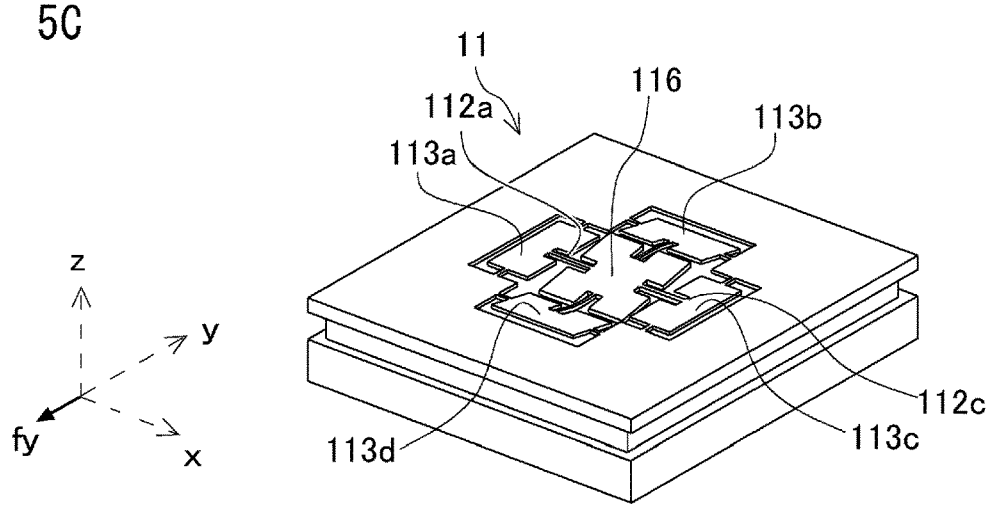
FIG. 5C is a perspective view for explaining a motion of a kinesthetic-sense sensor.

Next, movements of the moveable part of the kinesthetic-sense sensor 11 are described in detail with reference to FIGS. 5A to 5C. FIGS. 5A to 5C are perspective views for explaining movements of the kinesthetic-sense sensor. FIG. 5A shows a case where a pressing force fz in the z-axis negative direction is applied to the first force receiving part 111. FIG. 5B shows a case where a pressing force fx in the x-axis positive direction is applied to the first force receiving part 111. FIG. 5C shows a case where a pressing force fy in the y-axis negative direction is applied to the first force receiving part 111. Note that in FIGS. 5A to 5C, illustration of the first silicon layer 100 is omitted for the sake of explanation.

As shown in FIG. 5A, when the pressing force fz in the z-axis negative direction is applied to the first force receiving part 111, the first force receiving part 111 and the force receiving piece 116 joined to the first force receiving part 111 are displaced in the z-axis negative direction while remaining parallel to the xy-plane. As a result, the seesaw part 113a rotates so that the x-axis positive side thereof inclines to the z-axis negative side. Similarly, the seesaw part 113b rotates so that the y-axis negative side thereof inclines to the z-axis negative side, and the seesaw part 113c rotates so that the x-axis negative side thereof inclines to the z-axis negative side. Further, the seesaw part 113d rotates so that the y-axis positive side thereof inclines to the z-axis negative side.

As shown in FIG. 5B, when the pressing force fx in the x-axis positive direction is applied to the first force receiving part 111, the first force receiving part 111 rotates around the y-axis and also rotates the force receiving piece 116. Further, since the seesaw parts 113b and 113d do not rotate and each of the hinge beams 112b and 112d is twisted, they serve as supporting points for the rotational motion of the first force receiving part 111. Meanwhile, the seesaw parts 113a and 113c follow the movement of the first force receiving part 111 and thereby rotate in a direction opposite to the rotational direction of the first force receiving part 111. In FIG. 5B, the first force receiving part 111 rotates so that the x-axis positive side thereof inclines to the z-axis negative side. Therefore, the seesaw parts 113a and 113c rotate so that the x-axis negative sides thereof incline to the z-axis negative side.

As shown in FIG. 5C, when the pressing force fy in the y-axis negative direction is applied to the first force receiving part 111, the first force receiving part 111 rotates around the x-axis and also rotates the force receiving piece 116. Further, since the seesaw parts 113a and 113c do not rotate and each of the hinge beams 112a and 112c is twisted, they serve as supporting points for the rotational motion of the first force receiving part 111. Meanwhile, the seesaw parts 113b and 113d follow the movement of the first force receiving part 111 and thereby rotate in a direction opposite to the rotational direction of the first force receiving part 111. In FIG. 5C, the first force receiving part 111 rotates so that the y-axis negative side thereof inclines to the z-axis negative side. Therefore, the seesaw parts 113b and 113d rotate so that the y-axis positive sides thereof incline to the z-axis negative side.

Figure 6:
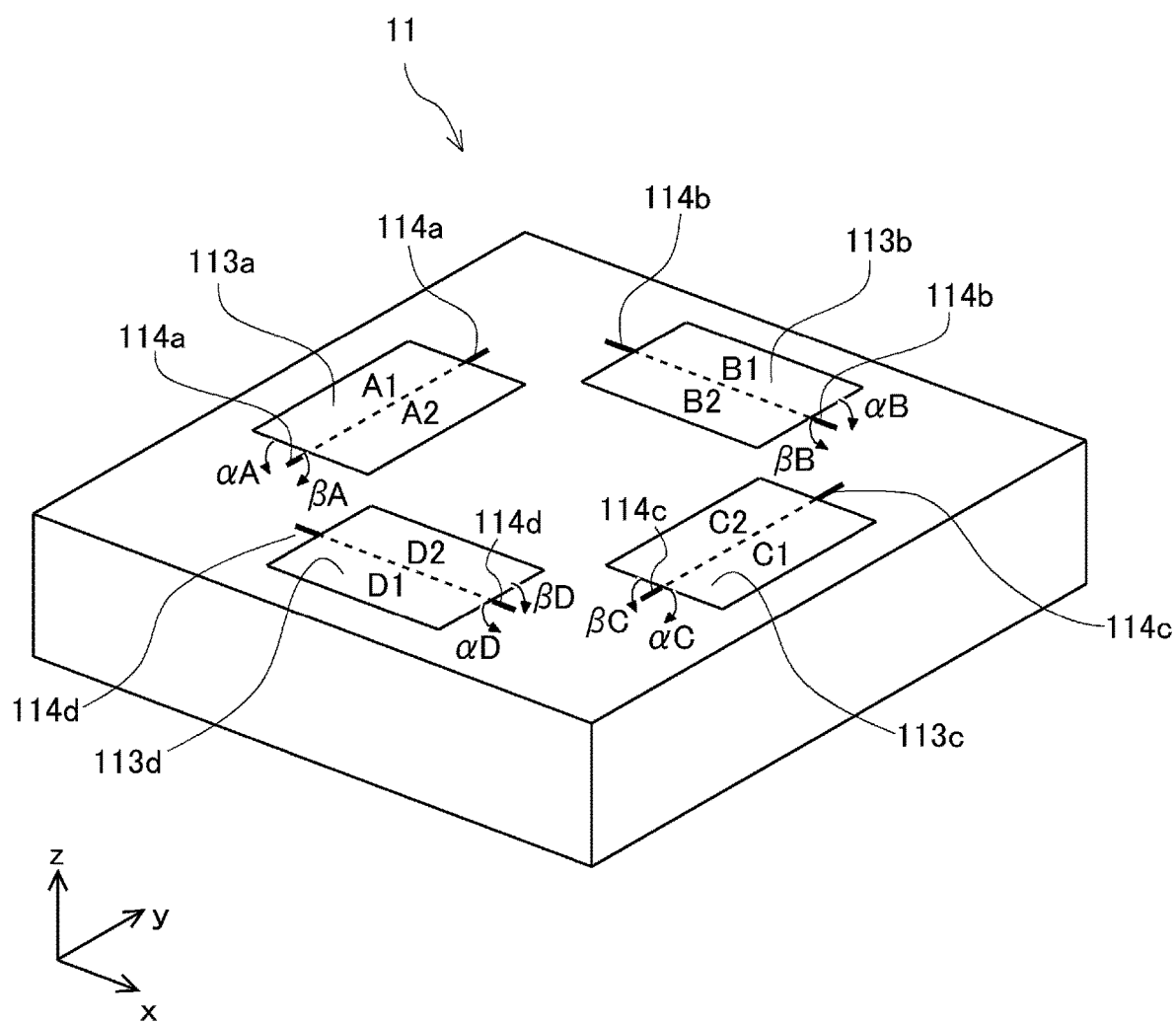
FIG. 6 is a perspective view for explaining a principle based on which a capacitance of a kinesthetic-sense sensor changes.

Next, outputs of the kinesthetic-sense sensor 11 are described with reference to FIG. 6. FIG. 6 is a perspective view for explaining a principle based on which the capacitance of the kinesthetic-sense sensor changes. FIG. 6 shows an example of an arrangement of the seesaw parts 113a to 113d and the torsion beams 114a to 114d in the kinesthetic-sense sensor 11.

Firstly, a change in the capacitance of the electrode corresponding to the seesaw part 113a is described. The capacitance of each of the seesaw parts 113a to 113d included in the kinesthetic-sense sensor 11 is changed based on a principle similar to that described below for the seesaw part 113a.

In the seesaw part 113a, the torsion beams 114a, which serve as the rotational axis of the seesaw part 113a, extend in the y-axis direction. Therefore, the seesaw part 113a rotates around the torsion beams 114a in an αA direction or a βA direction according to forces applied in the x- and y-axis directions. The capacitance on the outer side of the rotational axis of the seesaw part 113a is referred to as a capacitance A1 and the capacitance on the inner side of the rotational axis is referred to as a capacitance A2. When the seesaw part 113a rotates in the αA direction, the capacitance A1 decreases while the capacitance A2 increases. Further, when the seesaw part 113a rotates in the βA direction, the capacitance A1 increases while the capacitance A2 decreases. That is, the kinesthetic-sense sensor 11 includes an electrode that detects the capacitance A1, which is the capacitance on the outer side of the seesaw part 113a, and an electrode that detects the capacitance A2, which is the capacitance on the inner side of the seesaw part 113a. In this way, the kinesthetic-sense sensor 11 detects a difference between the capacitances A1 and A2 according to the rotational displacement of the seesaw part 113a.

The seesaw part 113a rotates in the αA direction when a force in the z-axis positive direction is applied to the first force receiving part 111, and rotates in the βA direction when a force in the z-axis negative direction is applied to the first force receiving part 111. The seesaw part 113a rotates in the βA direction when a force in the x-axis negative direction is applied to the first force receiving part 111, and rotates in the αA direction when a force in the x-axis positive direction is applied to the first force receiving part 111. The seesaw part 113a is not displaced when a force in the y-axis direction is applied.

Based on a principle similar to that explained above, the seesaw part 113b rotates in the αB direction and the βB direction by using the torsion beams 114b extending in the x-axis direction as its rotational axis. As a result of this rotation, capacitances B1 and B2 corresponding to the seesaw part 113b change. Similarly, the seesaw part 113c rotates in the αC direction and the βC direction by using the torsion beams 114c extending in the y-axis direction as its rotational axis. As a result of this rotation, capacitances C1 and C2 corresponding to the seesaw part 113c change. The seesaw part 113d rotates in the αD direction and the βD direction by using the torsion beams 114d extending in the x-axis direction as its rotational axis. As a result of this rotation, capacitances D1 and D2 corresponding to the seesaw part 113d change. In this way, the kinesthetic-sense sensor 11 detects differences between the electrodes included the respective seesaw parts 113a to 113d. The differences between the electrodes detected by the kinesthetic-sense sensor 11 are converted into pressing forces in the three axial directions by the below-shown Expression (1).

[Expression 1]

$$\begin{pmatrix} fx \\ fy \\ fz \\ 0 \end{pmatrix} = \frac{1}{4} \cdot \begin{pmatrix} 2 & 0 & -2 & 0 \\ 0 & 2 & 0 & -2 \\ 1 & 1 & 1 & 1 \\ 0 & 0 & 0 & 0 \end{pmatrix} \cdot \begin{pmatrix} A1 - A2 \\ B1 - B2 \\ C1 - C2 \\ D1 - D2 \end{pmatrix} \quad (1)$$

In the expression, fx is a pressing force in the x-axis direction received by the first force receiving part 111; fy is a pressing force in the y-axis direction received by the first force receiving part 111; and fz is a pressing force in the z-axis direction received by the first force receiving part 111. The calculation expressed by Expression (1) can be implemented by hardware including an analogue circuit or a digital circuit, software, or both of them. For example, an arithmetic circuit that performs the calculation expressed by Expression (1) may be disposed inside the substrate 14, or may be implemented by an external microcomputer or the like. The kinesthetic-sense sensor may be integrated with the semiconductor substrate. By integrating the kinesthetic-sense sensor with the semiconductor substrate, the arithmetic function can be incorporated into the semiconductor substrate, thereby making it possible to reduce the size of the unit sensor even further. Further, an improvement in the S/N ratio can also be expected.

As described above, the kinesthetic-sense sensor 11 includes the first force receiving part 111 that follows and moves in the z-axis direction, around the x-axis, and around the y-axis according to an external force. Further, the kinesthetic-sense sensor 11 outputs an external force received by the first force receiving part 111 as (signals corresponding to) pressing forces (fx, fy, fz) in the three axial directions.

Note that the configuration of the kinesthetic-sense sensor 11 described above is an example of a configuration of a sensor that can be used in the sensor unit 10 and specific configurations thereof are not limited to this example. For example, the number of seesaw parts connected to the first force receiving part 111 may be three instead of four.

Figure 7:
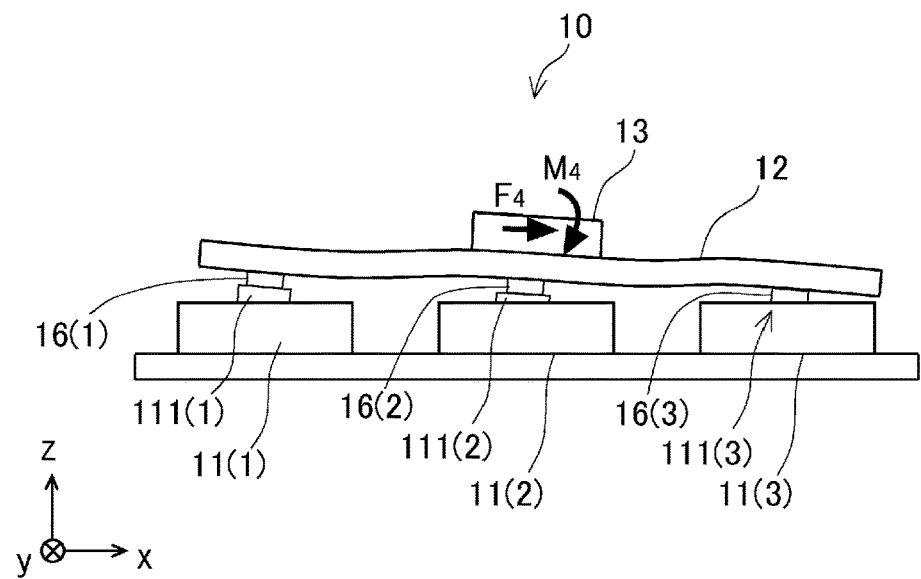
FIG. 7 shows a projection of a sensor unit according to the first embodiment on an xz-plane.

Next, a movement of each component that is caused when an external force is applied to the sensor unit 10 is described with reference to FIG. 7. FIG. 7 shows a projection of a sensor unit according to the first embodiment on the xz-plane. For ease of understanding, it is assumed that the pressing force and the moment occur only on the xz-plane in FIG. 7. The sensor unit 10 shown in FIG. 7 includes three kinesthetic-sense sensors 11(1) to 11(3).

In FIG. 7, the sensor unit 10 receives a resultant force of a pressing force $F_4$ and a moment $M_4$ as an external force at the second force receiving part 13. The pressing force $F_4$ includes a component in the x-axis positive direction. Further, the moment $M_4$ includes a clockwise component as viewed in the y-axis negative direction. As the connecting plate 12 receives the pressing force $F_4$, it is displaced in the x-axis positive direction. At the same time, as the connecting plate 12 receives the moment $M_4$, it is inclined in the z axis negative direction as it moves in the x-axis positive direction. Further, since the connecting plate 12 is flexible, it can bend according to the inclination of each first force receiving part 111. Further, the connecting plate 12 can be configured so as to have non-uniform rigidity. That is, it is possible to make the connecting plate 12 rigid in the Z-direction by increasing the thickness of the central part thereof or increasing the width the central part thereof. Alternatively, it is possible to make the connecting plate 12 soft in the Z-direction by reducing the thickness of both ends thereof or reducing the width of both ends thereof. By this configuration, the connecting plate 12 can deform in conformity with the inclination of the connecting part 16, thereby making it possible to reduce the cross-axis sensitivity.

Each of the first force receiving parts 111(1) to 111(3) is displaced in accordance with the movement of the connecting plate 12. More specifically, they are displaced as follows. Firstly, the first force receiving parts 111(1) to 111(3) receive only forces in the x-axis positive direction due to the component in the x-axis positive direction included in the pressing force $F_4$. Further, due to the moment $M_4$, the first force receiving part 111(1) is positioned on the z-axis positive side relative to the first force receiving part 111(2), and the first force receiving part 111(3) is positioned on the z-axis negative side relative to the first force receiving part 111(2). As described above, the connecting plate 12 transfers divided forces of an external force received by the second force receiving part 13 to the first force receiving parts 111. The first force receiving parts 111 follow and move in the z-direction, around the x-axis, and around the y-axis according to their respective received divided forces. By the above-described configuration, the sensor unit 10 transfers the force received by the second force receiving part to each of the kinesthetic-sense sensors arranged on the plane. Therefore, it is possible to reduce the thickness of the sensor unit 10 in the direction perpendicular to the plane on which the kinesthetic-sense sensors are arranged. By the above-described configuration, it is possible to reduce the thickness of the sensor unit 10.

Figure 8:
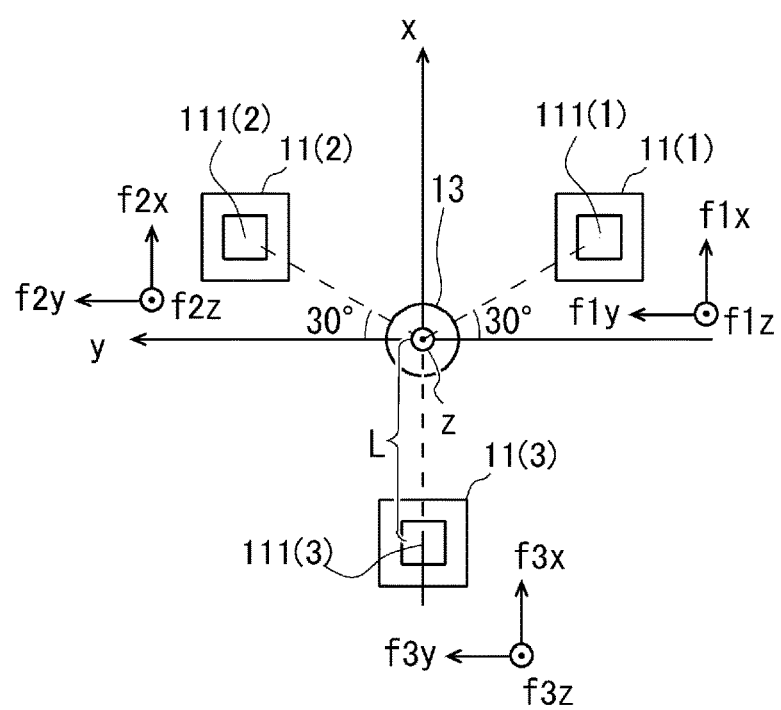
FIG. 8 is a schematic diagram for explaining an example of calculation of pressing forces and moments in a sensor unit according to the first embodiment.

Next, another example of the principle based on which the sensor unit 10 calculates a pressing force and a moment received at the second force receiving part based on outputs from each of the kinesthetic-sense sensors 11 is described with reference to FIG. 8. FIG. 8 is a schematic diagram for explaining an example of calculation of pressing forces and moments in the sensor unit. In FIG. 8, the x-axis extends in the vertical direction in the drawing and the x-axis positive direction is the upward direction in the drawing. The y-axis extends in the left/right direction in the drawing and the y-axis positive direction is the leftward direction in the drawing. The z-axis extends in the front/rear direction in the drawing and the z-axis positive direction is the approaching direction in the drawing. FIG. 8 shows a state in which the sensor unit 10 disposed on the xy-plane is viewed from the z-axis positive side, and the second force receiving part 13 is located at the intersection of the x- and y-axes. Note that the central point of the second force receiving part 13 is a force-applied point at which the second force receiving part 13 receives an external force. That is, in FIG. 8, the force-applied point in the second force receiving part 13 coincides with the intersection of the x- and y-axes.

The three kinesthetic-sense sensors 11(1) to 11(3) are arranged around the second force receiving part 13. Each of the kinesthetic-sense sensors 11(1) to 11(3) is disposed so that the length between the center of its first force receiving part (i.e., one of the first force receiving parts 111(1) to 111(3)) and the force-applied point becomes a length L. The first kinesthetic-sense sensor 11(1) is located in an area on the x-axis positive side and the y-axis negative side, and an angle between a straight line connecting the first kinesthetic-sense sensor 11(1) with the force-applied point and the y-axis is 30 degrees. The second kinesthetic-sense sensor 11(2) is located in an area on the x-axis positive side and the y-axis positive side, and an angle between a straight line connecting the second kinesthetic-sense sensor 11(2) with the force-applied point and the y-axis is 30 degrees. The third kinesthetic-sense sensor 11(3) is located on the x-axis negative side and on the x-axis (y=0).

The kinesthetic-sense sensors 11(1) to 11(3) output (signals corresponding to) pressing forces in the three axial directions of the divided forces, received by the respective first force receiving parts 111(1) to 111(3). That is, the first kinesthetic-sense sensor 11(1) outputs (signals corresponding to) a pressing force f1x in the x-axis direction, a pressing force f1y in the y-axis direction, and a pressing force f1z in the z-axis direction. Similarly, each of the other kinesthetic-sense sensors outputs (signals corresponding to) pressing forces along the x-, y- and z-axes.

In the case of the above-described configuration, the pressing forces Fx, Fy and Fz in the three axial directions and the moments Mx, My and Mz around the three axes received at the force-applied point of the second force receiving part 13 are calculated by the below-shown Expressions (2) to (7).

[Expression 2]
$$Fx = f1x + f2x + f3x \quad (2)$$

[Expression 3]
$$Fy = f1y + f2y + f3y \quad (3)$$

[Expression 4]
$$Fz = f1z + f2z + f3z \quad (4)$$

[Expression 5]
$$Mx = -\frac{\sqrt{3}}{2}Lf1z + \frac{\sqrt{3}}{2}Lf2z \quad (5)$$

[Expression 6]
$$My = -\frac{L}{2}f1z - \frac{L}{2}f2z + Lf3z \quad (6)$$

[Expression 7]
$$My = \frac{L}{2}(\sqrt{3}f1x + f1y) + \frac{L}{2}(-\sqrt{3}f2x + f2y) - Lf3y \quad (7)$$

As described above, in the first embodiment, when the distances and the relative positional relations between the force-applied point and the first force receiving parts 111 are known, it is possible to calculate the pressing forces and the moments received at the force-applied point based on the outputs of the sensor unit 10.

Figure 9A:
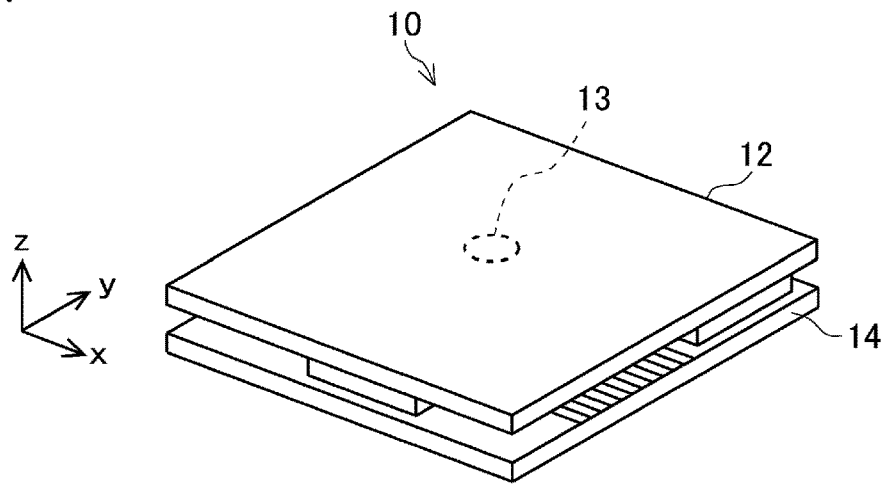
FIG. 9A shows perspective views for explaining examples of shapes of a connecting member 12 and a second force receiving part 13.
Figure 9B:
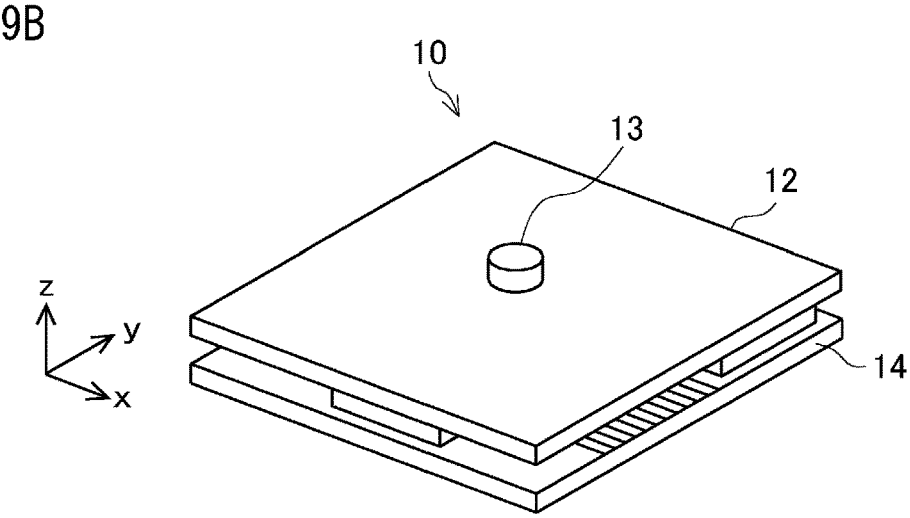
FIG. 9B shows perspective views for explaining examples of shapes of a connecting member 12 and a second force receiving part 13.
Figure 9C:
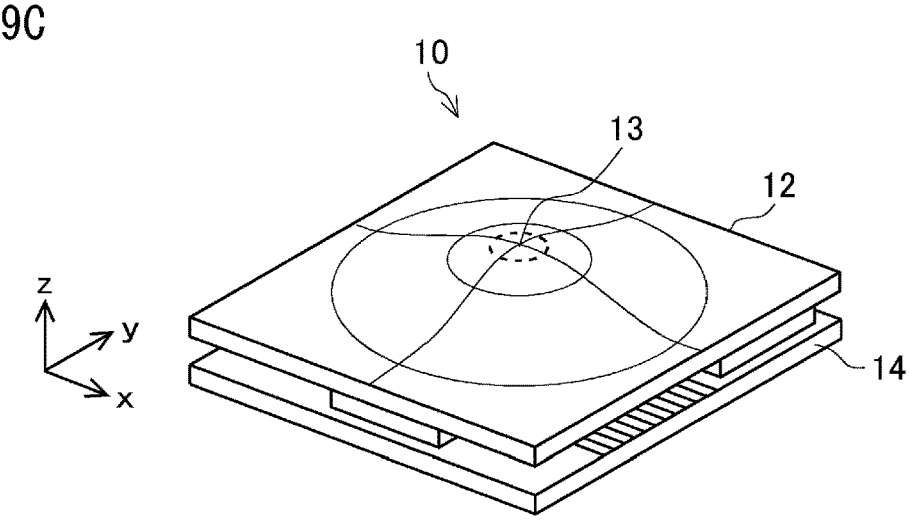
FIG. 9C shows perspective views for explaining examples of shapes of a connecting member 12 and a second force receiving part 13.

Next, various examples of the connecting plate 12 and the second force receiving part 13 are described with reference to FIGS. 9A to 9C. FIGS. 9A to 9C are perspective views for explaining examples of shapes of the connecting plate 12 and the second force receiving part 13. In FIG. 9A, an upper surface (a surface on the z-axis positive side) of the connecting plate 12 is a flat surface. The second force receiving part 13 is indicated by a dotted line on the upper surface of the connecting plate 12. The second force receiving part 13 serves as an area that is defined in advance as a part where an external force is received. Therefore, the sensor unit 10 shown in FIG. 9A receives an external force at the second force receiving part 13 indicated by the dotted line on the upper surface of the connecting plate 12. That is, the force-applied point at which the sensor unit 10 receives an external force is inside the area of the second force receiving part 13.

Next, an example shown in FIG. 9B is described. In FIG. 9B, an upper surface of the connecting plate 12 is a flat surface. The second force receiving part 13 is vertically disposed in a columnar shape on the upper surface of the connecting plate 12. Therefore, the sensor unit 10 shown in FIG. 9B receives an external force at the second force receiving part 13 having the columnar shape on the upper surface of the connecting plate 12. By the above-described configuration, the second force receiving part 13 can reliably receive an external force.

Next, an example of FIG. 9C is described. In FIG. 9C, an upper surface of the connecting plate 12 has a spindle-like shape with its top located at the center of the upper surface. The second force receiving part 13 is set in the top area on the upper surface of the connecting plate 12. By the above-described configuration, the second force receiving part 13 can distribute a received external force to the kinesthetic-sense sensors 11. Note that various shapes other than those described above can be adopted as the shapes of the connecting plate 12 and the second force receiving part 13.

By the above-described configuration, the sensor unit 10 outputs (signals corresponding to) a pressing force in the z-axis direction orthogonal to the XY-plane and pressing forces in the x- and y-axis directions, respectively, which are the components of the divided forces of the external force received by the second force receiving part 13 and are received by the respective first force receiving parts 111 through the connecting plate 12.

Modified Example of First Embodiment

Figure 10:
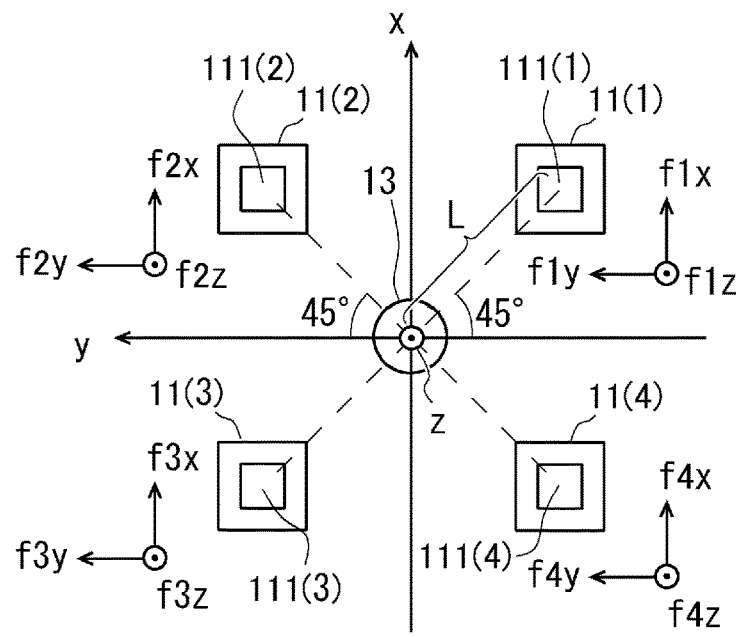
FIG. 10 is a schematic diagram for explaining an example of calculation of pressing forces and moments in a sensor unit according to a modified example of the first embodiment.

Next, modified examples of the first embodiment are described with reference to FIG. 10. In the example shown in FIG. 10, a sensor unit 10 includes four kinesthetic-sense sensors 11. FIG. 10 is a schematic diagram for explaining an example of calculation of pressing forces and moments in the sensor unit. Note that relative positional relations between the x-, y- and z-axes and the sensor unit 10 in FIG. 10 are similar to those in FIG. 8. That is, in FIG. 10, the force-applied point of the second force receiving part 13 also coincides with the intersection of the x- and y-axes.

Four kinesthetic-sense sensors 11(1) to 11(4) are arranged around the second force receiving part 13. Each of the kinesthetic-sense sensors 11(1) to 11(4) is disposed so that the length between the center of its first force receiving part (i.e., one of the first force receiving parts 111(1) to 111(4)) and the force-applied point becomes a length L. The first kinesthetic-sense sensor 11(1) is located in an area on the x-axis positive side and the y-axis negative side, and an angle between a straight line connecting the first kinesthetic-sense sensor 11(1) with the force-applied point and the x-axis or the y-axis is 45 degrees. The second kinesthetic-sense sensor 11(2) is located in an area on the x-axis positive side and the y-axis positive side, and an angle between a straight line connecting the second kinesthetic-sense sensor 11(2) with the force-applied point and the x-axis or the y-axis is 45 degrees. The third kinesthetic-sense sensor 11(3) is located in an area on the x-axis negative side and the y-axis positive side, and an angle between a straight line connecting the third kinesthetic-sense sensor 11(3) with the force-applied point and the x-axis or the y-axis is 45 degrees. The fourth kinesthetic-sense sensor 11(4) is located in an area on the x-axis negative side and the y-axis negative side, and an angle between a straight line connecting the fourth kinesthetic-sense sensor 11(4) with the force-applied point and the x-axis or the y-axis is 45 degrees.

The kinesthetic-sense sensors 11(1) to 11(4) output (signals corresponding to) pressing forces in the three axial directions of the divided forces, received by the respective first force receiving parts 111(1) to 111(4). That is, the first kinesthetic-sense sensor 11(1) outputs (signals corresponding to) a pressing force $f1x$ in the x-axis direction, a pressing force $f1y$ in the y-axis direction, and a pressing force $f1z$ in the z-axis direction. Similarly, each of the other kinesthetic-sense sensors outputs (signals corresponding to) pressing forces along the x-, y- and z-axes.

In the case of the above-described configuration, the pressing forces Fx, Fy and Fz in the three axial directions and the moments Mx, My and Mz around the three axes received at the force-applied point of the second force receiving part 13 are calculated by the below-shown Expressions (8) to (13).

[Expression 8]
$$Fx = f1x + f2x + f3x + f4x \quad (8)$$

[Expression 9]
$$Fy = f1y + f2y + f3y + f4y \quad (9)$$

[Expression 10]
$$Fz = f1z + f2z + f3z + f4z \quad (10)$$

[Expression 11]
$$Mx = (-f1z - f4z) \cdot \frac{L}{\sqrt{2}} + (f2z + f3z) \cdot \frac{L}{\sqrt{2}} \quad (11)$$

[Expression 12]
$$My = (-f1z - f2z) \cdot \frac{L}{\sqrt{2}} + (f3z + f4z) \cdot \frac{L}{\sqrt{2}} \quad (12)$$

[Expression 13]
$$My = (f1x + f1y) \cdot \frac{L}{\sqrt{2}} + (-f2x + f2y) \cdot \frac{L}{\sqrt{2}} + \\ (-f3x - f3y) \cdot \frac{L}{\sqrt{2}} + (f4x - f4y) \cdot \frac{L}{\sqrt{2}} \quad (13)$$

Similarly to the example shown in FIG. 8, in the first embodiment, when the distances and the relative positional relations between the force-applied point and the first force receiving parts 111 are known, it is possible to calculate the pressing forces and the moments received at the force-applied point based on the outputs of the sensor unit 10. Note that as described above, in order to calculate pressing forces and moments at the force-applied point, it is preferable to position the force-applied point inside an outer edge (i.e., contour) formed by connecting the kinesthetic-sense sensors arranged on the plane.

The first embodiment and the modified examples thereof have been described above. However, the connecting plate 12 is not limited to plate-like members like those described above. The connecting plate 12 may have a beam-like shape or a disc-like shape as long as it has the second force receiving part 13 and is connected to each of the first force receiving parts.

By the above-described configuration, according to the first embodiment, the sensor unit transfers divided forces of the pressing force and the moment received by the second force receiving part to the kinesthetic-sense sensors. Each of the kinesthetic-sense sensors outputs a signal(s) corresponding to the pressing forces in the three axial directions for the divided force received by that kinesthetic-sense sensor. Further, it is possible to calculate the pressing forces in the three axial directions and the moments around the three axes based on the signals output from the sensor unit 10. As described above, according to the first embodiment, it is possible to provide, for example, a six-axis sensor unit capable of reducing its size and thickness.

Second Embodiment

Next, a second embodiment is described with reference to FIG. 11. A sensor unit 10 according to the second embodiment differs from the first embodiment in the configuration of the connecting member and the connecting parts. That is, in the sensor unit 10 according to the second embodiment, the connecting parts 16, instead of the connecting plate 12, have flexibility.

Figure 11:
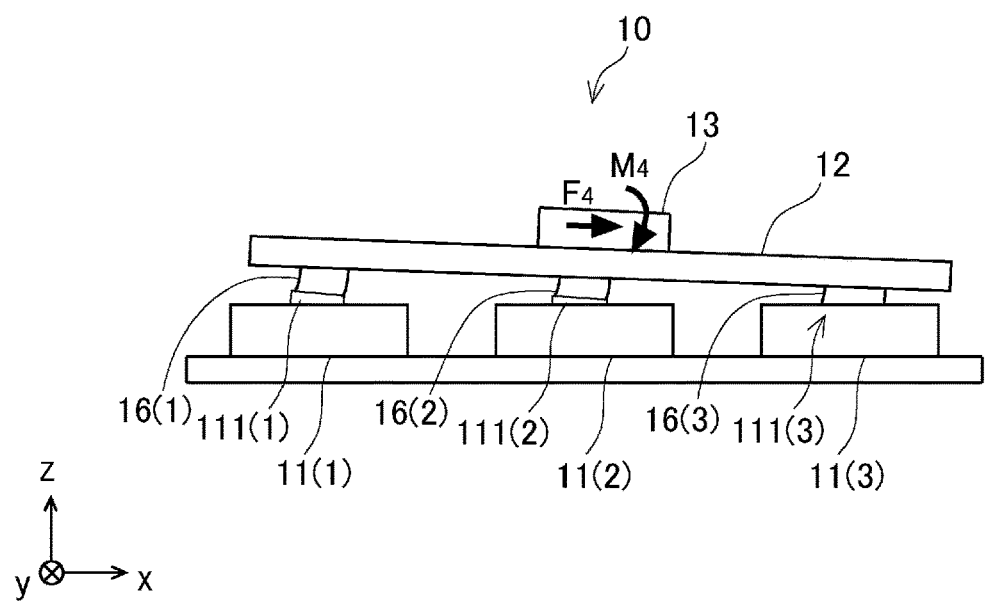
FIG. 11 shows a projection of a sensor unit according to a second embodiment on an xz-plane.

FIG. 11 shows a projection of the sensor unit 10 according to the second embodiment on the xz-plane. For ease of understanding, it is assumed that the pressing force and the moment occur only on the xz-plane in FIG. 11. The sensor unit 10 shown in FIG. 11 includes three kinesthetic-sense sensors 11(1) to 11(3). In FIG. 11, since the connecting parts 16 are flexible, the angle between the opposed surfaces of the connecting plate 12 and the first force receiving parts 111 can be changed. The material for the connecting parts 16 may be, for example, a soft material containing a silicon resin, an elastomer, etc. as its main component, or may be an acrylic or urethane-based adhesive or the like. Meanwhile, in this case, it is possible to select, as a material for the connecting plate 12, a material having higher rigidity than that of the connecting plate 12 of the first embodiment. For example, the connecting plate 12 according to the second embodiment may be a plate containing aluminum, iron, etc. as its main component. Further, even when a resin is used, it is possible to select a material (i.e., a resin) having higher rigidity than that in the first embodiment. Alternatively, even if the same material as that in the first embodiment is used, its thickness can be increased.

In FIG. 11, the sensor unit 10 receives a resultant force of a pressing force $F_4$ and a moment $M_4$ as an external force at the second force receiving part 13. The pressing force $F_4$ includes a component in the x-axis positive direction. Further, the moment $M_4$ includes a clockwise component as viewed in the y-axis negative direction. Therefore, as the connecting plate 12 receives the pressing force $F_4$, it is displaced in the x-axis positive direction. At the same time, as the connecting plate 12 receives the moment $M_4$, it is inclined in the z axis negative direction as it moves in the x-axis positive direction.

Each of the first force receiving parts 111(1) to 111(3) is displaced in accordance with the movement of the respective connecting part 16. More specifically, they are displaced as follows. Firstly, the first force receiving parts 111(1) to 111(3) receive forces in the x-axis positive direction due to the component in the x-axis positive direction included in the pressing force $F_4$. Note that since the connecting parts 16 are flexible, the connecting plate 12 and the first force receiving parts 111 have such a configuration that they forms a certain angle therebetween according to the amount of the shift of the connecting plate 12 in the x-axis direction. Further, due to the moment $M_4$, the first force receiving part 111(1) is positioned on the z-axis positive side relative to the first force receiving part 111(2), and the first force receiving part 111(3) is positioned on the z-axis negative side relative to the first force receiving part 111(2).

As described above, the connecting plate 12 transfers divided forces of an external force received by the second force receiving part 13 to the first force receiving parts 111 through the connecting parts 16. The first force receiving parts 111 follow and move in the z-direction, around the x-axis, and around the y-axis according to their respective received divided forces. Therefore, it is possible to reduce the thickness of the sensor unit 10 in the direction perpendicular to the plane on which the kinesthetic-sense sensors are arranged. By the above-described configuration, it is possible to reduce the thickness of the sensor unit 10. Note that needless to say, in the second embodiment, the number of kinesthetic-sense sensors 11 is also not limited to three, but may be four or more.

Third Embodiment

Figure 12:
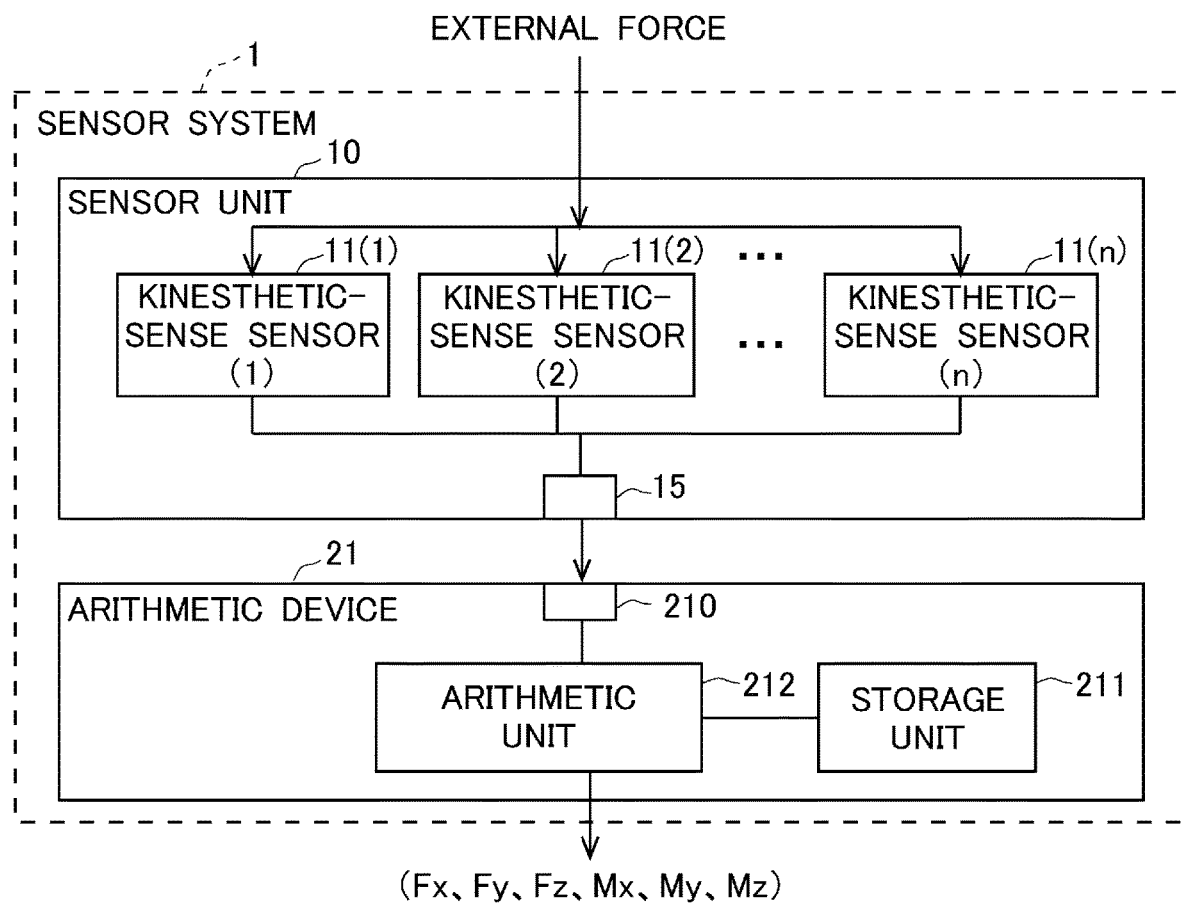
FIG. 12 is a functional block diagram of a sensor system using a sensor unit according to a third embodiment.

Next, a third embodiment is described with reference to FIG. 12. A sensor system 1 according to the third embodiment uses a sensor unit 10 according to the first or second embodiment. FIG. 12 is a functional block diagram of the sensor system according to the third embodiment. The sensor system 1 includes a sensor unit 10 and an arithmetic device 21. The arithmetic device 21 receives outputs of the sensor unit 10 and performs, for example, the processing described above with reference to FIGS. 9A-9C and 10 based on the received output values. The arithmetic device 21 outputs, as calculation results, pressing forces Fx, Fy and Fz in the three axial directions and moments Mx, My and Mz around the three axes received by the second force receiving unit 13. Note that the means through which the arithmetic device 21 receives outputs of the sensor unit 10 may be either wired means or wireless means, or may be other means.

The arithmetic device 21 includes a sensor signal acquisition unit 210 that acquires signals output from the sensor unit 10. Further, the arithmetic device 21 includes a storage unit 211 and an arithmetic unit 212. The storage unit 211 stores, in advance, data on distances and relative positional relations between the first force receiving parts 111 and the second force receiving part of the sensor unit 10. The distance and the relative positional relation between each of the first force receiving parts 111 and the second force receiving part of the sensor unit 10 are determined based on the arrangement of the kinesthetic-sense sensors 11 in the sensor unit 10 and the position of the second force receiving part 13 in the sensor unit 10. Therefore, when the arrangement of the kinesthetic-sense sensors 11 and the position of the second force receiving part 13 are changed, the data to be stored is also changed. The storage unit 211 supplies these stored data to the arithmetic unit 212 as required.

The arithmetic unit 212 calculates pressing forces Fx, Fy and Fz in the three axial directions and moments Mx, My and Mz around the three axes received by the sensor unit 10 based on the signals received from the sensor unit 10 through the sensor signal acquisition unit 210 and the data received from the storage unit 211. Note that in the sensor system 1, the arithmetic device 21 may be incorporated into the substrate 14. Further, the arithmetic device 21 may be a server device.

Figure 13:
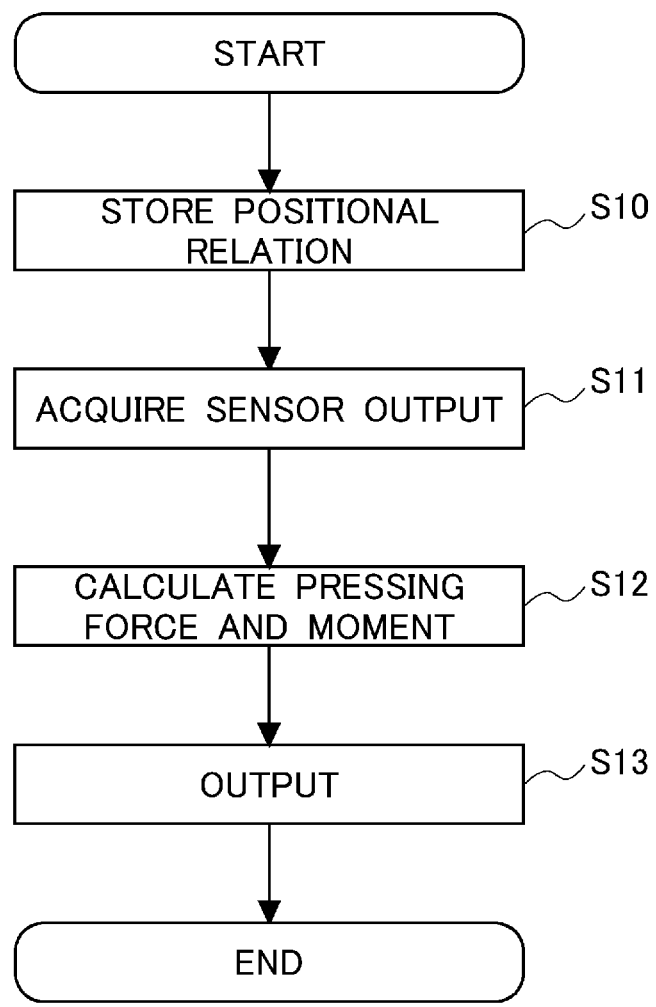
FIG. 13 is a flowchart showing processes performed by an arithmetic unit.

Next, processes performed by the arithmetic device are described with reference to FIG. 13. FIG. 13 is a flowchart showing processes performed the arithmetic device. Firstly, the storage unit 211 stores data on positional relations (step S10). The data on positional relations is data on distances and relative positional relations between the force-applied point and the first force receiving parts 111 in the sensor unit 10. Next, the sensor signal acquisition unit 210 acquires outputs of the sensor unit 10 (step S11). Next, upon receiving the data on the positional relations from the storage unit 211 and the outputs of the sensor unit 10 from the sensor signal acquiring unit 210, the arithmetic unit 212 calculates pressing forces and moments received by the sensor unit 10 based on the received data and the outputs (step S 12). Then, the arithmetic device 21 outputs a result of the calculation performed by the arithmetic unit 212 (step S13). More specifically, the arithmetic device 21 outputs the calculated values of the pressing forces Fx, Fy and Fz in the three axial directions and the moments Mx, My and Mz around the three axes.

Figure 14:
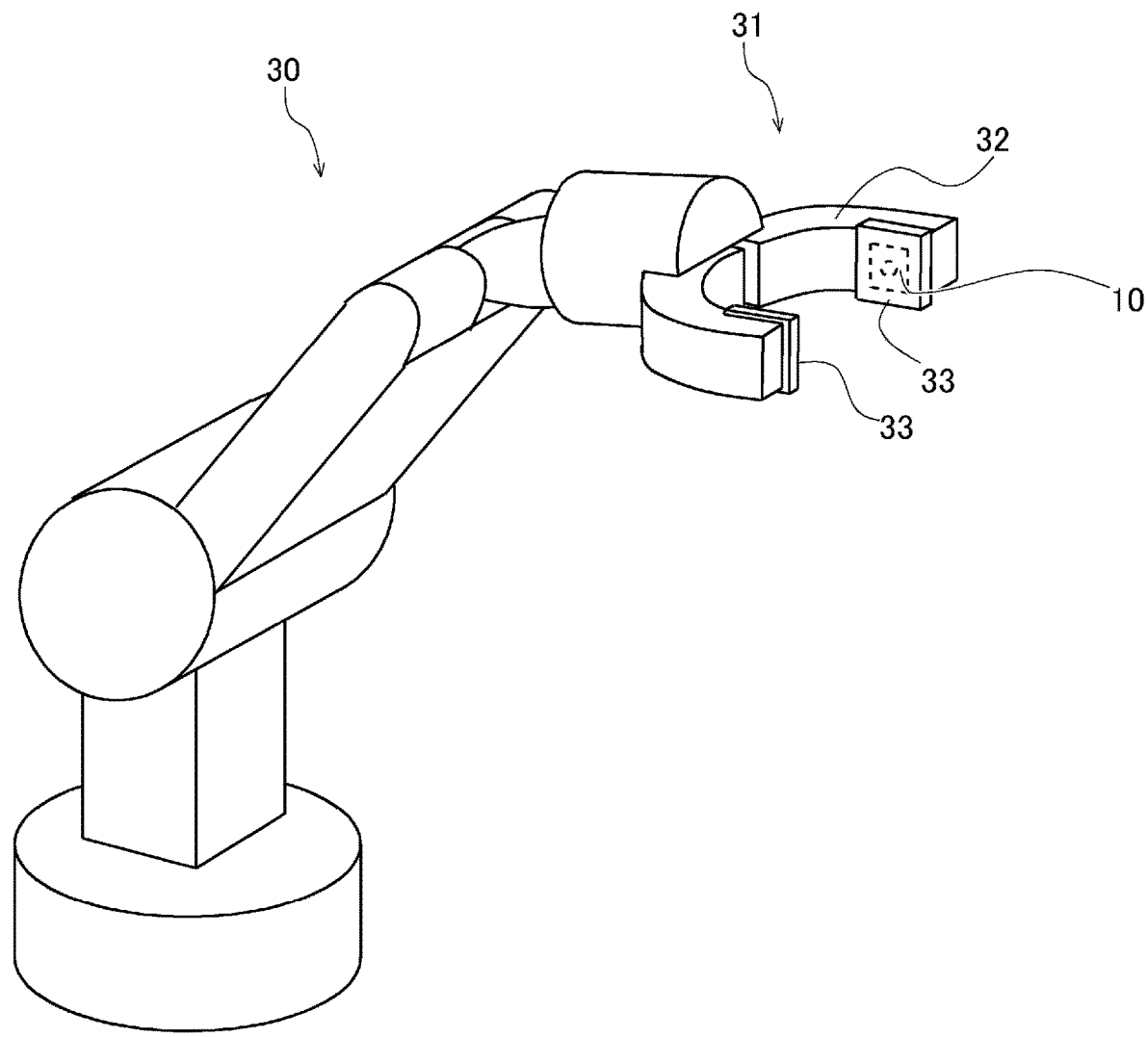
FIG. 14 is a perspective view of a robot arm using a sensor unit according to the third embodiment.

Next, a specific example of a sensor unit according to the second embodiment is described with reference to FIGS. 14 and 15. FIG. 14 is a perspective view of a robot arm using a sensor unit according to the first embodiment. The robot arm 30 shown in FIG. 14 includes a robot hand 31 at the tip of the robot arm. The robot hand 31 includes a driving unit (not shown) and moves two finger parts 32 toward each other and away from each other. Accordingly, the robot hand 31 is configured to perform motions of grasping and releasing an object. Two contact parts 33 are provided at the tips of the respective finger parts 32 so that they are opposed to each other. Each of the contact parts 33 is formed of an elastic member (e.g., an elastic sheet). The main surfaces of the contact parts 33 that are opposed to each other serve as parts that come into direct contact with an object when the robot hand grasps the object. A sensor unit 10 is provided on (one or each of) the other surfaces of the contact parts 33, i.e., the surfaces of the contact parts 33 opposite to the mutually-opposed main surfaces. The sensor unit 10 is covered with the elastic member (i.e., the contact part 33). Therefore, when an impact occurs on the surface of the contact part 33, the input to the sensor unit 10 is mitigated, thus making it possible to softly grasp the object.

Figure 15:
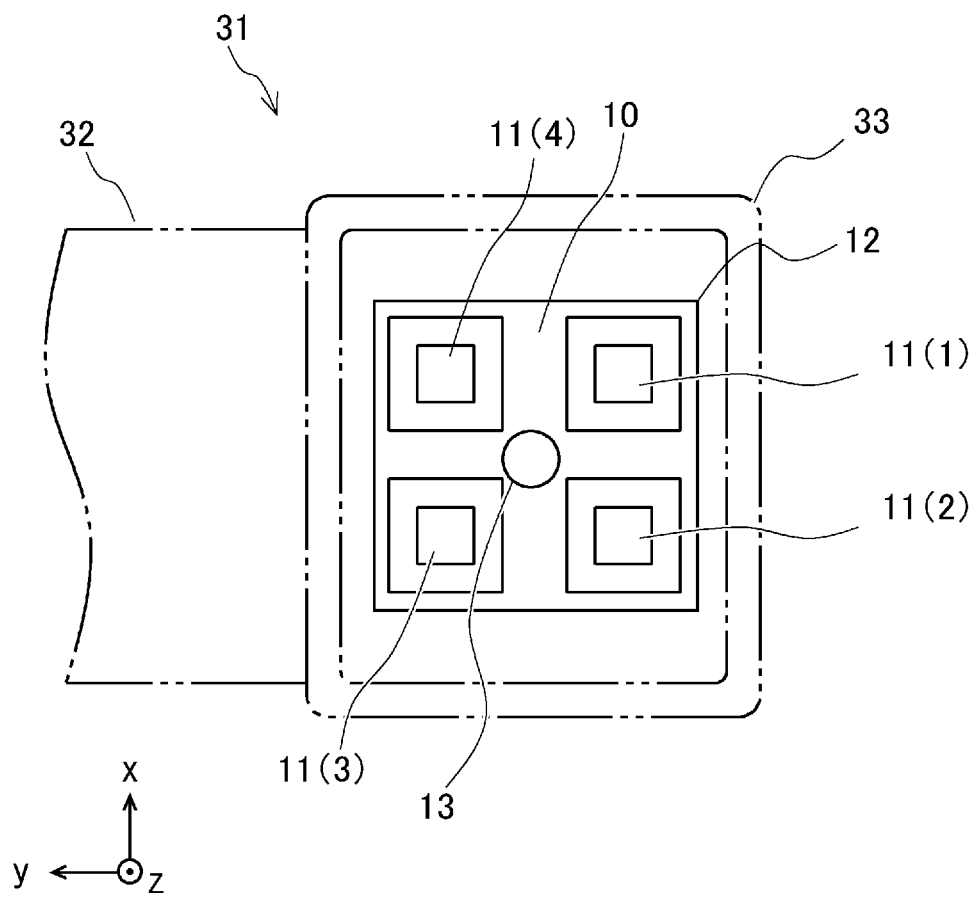
FIG. 15 shows a configuration of a robot hand using a sensor unit according to the third embodiment.

FIG. 15 shows a configuration of a robot hand using a sensor unit according to the first embodiment. In FIG. 15, a right-handed orthogonal coordinate system is shown. In FIG. 15, the upward direction is the x-axis positive direction and the leftward direction is the y-axis positive direction. Further, the front side (i.e., this side) of the drawing is the z-axis positive side. FIG. 15 is a view of the finger part 32 and the contact part 33 of the robot hand 31 as viewed from the side on which the main surface of the contact part 33 is located. The sensor unit 10 is provided on the surface of the contact part 33 opposite to the main surface thereof. The second force receiving part 13 of the sensor unit 10 is connected to the contact part 33. Further, the contact part 33 is disposed so that it can move within a predetermined range. That is, the robot hand is configured so that an external force received by the contact part 33 is transferred to the second force receiving part 13 of the sensor unit 10. The external force received by the second force receiving part 13 is transferred to four kinesthetic-sense sensors 11 included in the sensor unit 10 through the connecting plate 12.

By the above-described configuration, when the robot arm or robot hand including the sensor unit 10 grasps an object, it can detect a pressing force and a moment applied to the robot hand. In this case, the sensor unit 10 can be expressed as a tactile sensor of the robot hand 31. That is, the output unit 15 of the sensor unit 10 outputs a tactile sense of the robot hand 31 through the contact unit 33. Further, by the above-described configuration, it is possible to reduce the size of the robot hand by mounting the sensor unit according to the first embodiment on the robot hand.

Note that although an example in which the sensor unit 10 includes four kinesthetic-sense sensors 11 is shown, the number of kinesthetic-sense sensors 11 may be any number no less than three. Further, although an example in which one sensor unit 10 is disposed on the contact part 33 of the finger part 32 is shown in FIGS. 13 and 14, two or more sensor units 10 may be disposed on the contact part 33.

Further, the robot arm 30 or the robot hand 31 may or may not include the arithmetic device 21.

Modified Example of Third Embodiment

Figure 16:
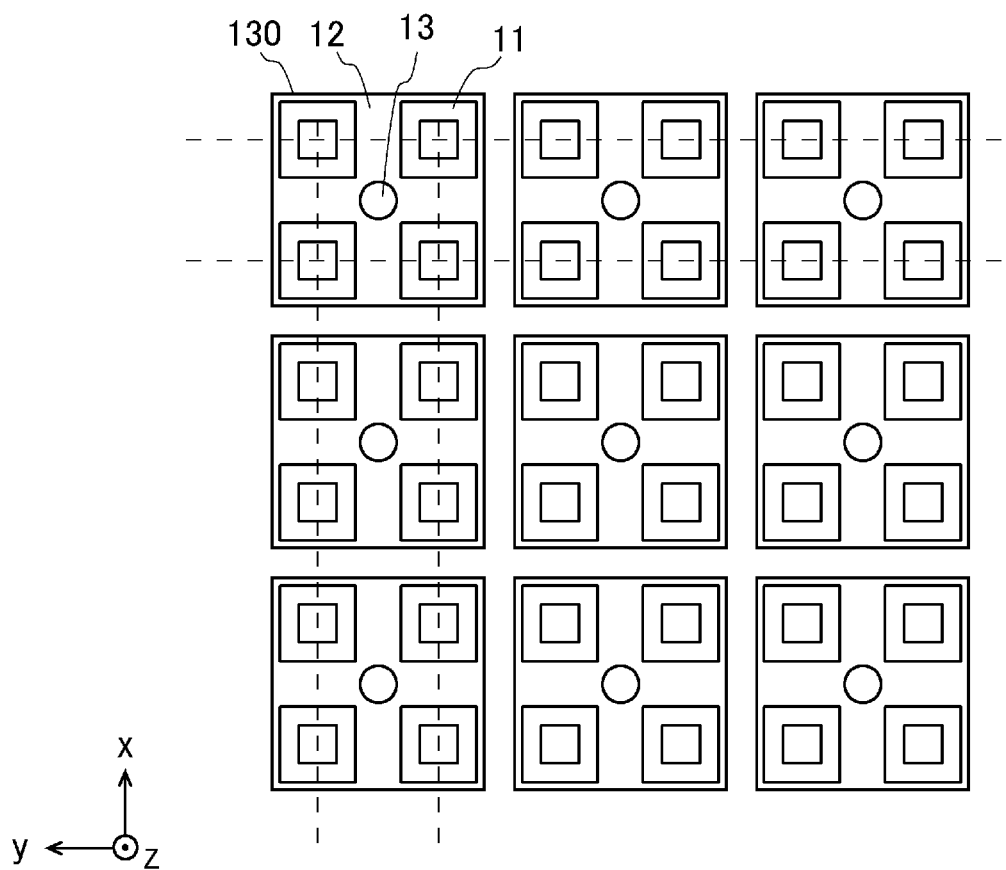
FIG. 16 shows an example in which sensor units according to a modified example of the third embodiment are arranged on a plane.
Figure 17:
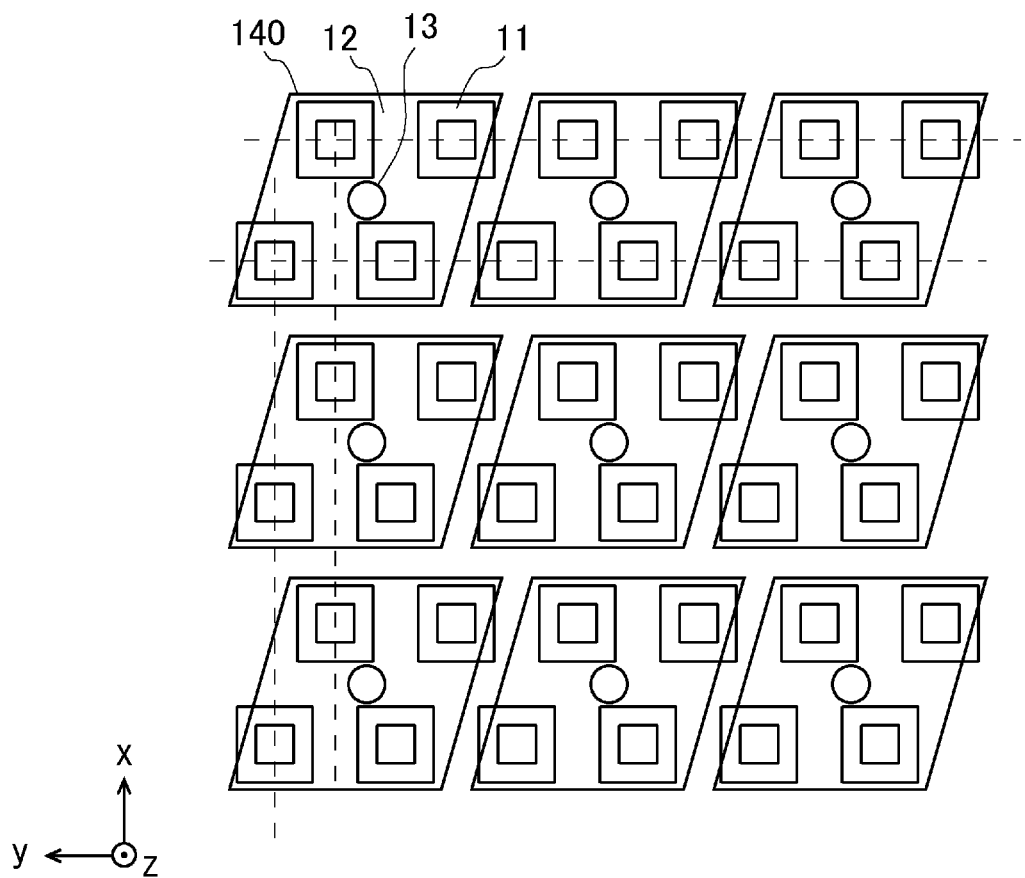
FIG. 17 shows an example in which sensor units according to a modified example of the third embodiment are arranged on a plane.

Next, various examples of the arrangement of sensor units are described as modified examples of the third embodiment with reference to FIGS. 16 and 17. FIG. 16 shows an example in which a plurality of sensor units according to the first embodiment are arranged on a plane. In each sensor unit 130 shown in FIG. 16, four kinesthetic-sense sensors 11 are arranged around a second force receiving part 13. The four kinesthetic-sense sensors are arranged in such a configuration that two rows are arranged along the x-axis and two columns are arranged along the y-axis. Further, a plurality of sensor units 130, each of which has the above-described configuration, are arranged along the x-axis direction and along the y-axis direction. In particular, the sensor units 130 are arranged in a 3-by-3 array. Further, the connecting plate 12 has a rectangular shape.

By arranging a plurality of sensor units 130 in this manner, adjacent first force receiving parts are arranged in a straight line in the x-axis direction and also arranged in a straight line in the y-axis direction. In the example shown in FIG. 16, three rows of sensor units 130 are arranged in the x-axis direction and three columns of sensor units 130 are arranged in the y-axis direction. By arranging a plurality of sensor units 130 on a plane in this manner, it is possible to configure (i.e., arrange) sensor units each of which detects pressing forces in the three axial directions and moments around the three axes along a desired plane.

FIG. 17 shows another example in which sensor units according to the first embodiment are arranged on a plane. Sensor units 140 shown in FIG. 17 differ from the sensor units 130 shown in FIG. 16 in the arrangement of the kinesthetic-sense sensors 11 and the shape of the connecting plates 12. In each sensor unit 140, the connecting plate 12 has a diamond shape. The four kinesthetic-sense sensors 11 included in each sensor unit 140 are arranged in two rows along the y-axis direction. In the example shown in FIG. 17, the kinesthetic-sense sensors 11 are not arranged along the x-axis direction, but are arranged along sides of the diamond shape, which is the shape of the connecting plate 12. In the sensor units 140 according to the modified example of the third embodiment, regarding the arrangement along the x-axis direction, adjacent first force receiving parts 111 are not arranged in a straight line. Further, the sensor units are not limited to those shown in FIGS. 16 and 17 and can have various other forms.

By the above-described configuration, the sensor system according to the third embodiment makes it possible to arrange six-axis sensor units, each of which is capable of reducing its size and thickness, on a desired plane. Therefore, according to the third embodiment, it is possible to provide a sensor system including six-axis sensor units, capable of preventing the size of the system from increasing.

Fourth Embodiment

Figure 18:
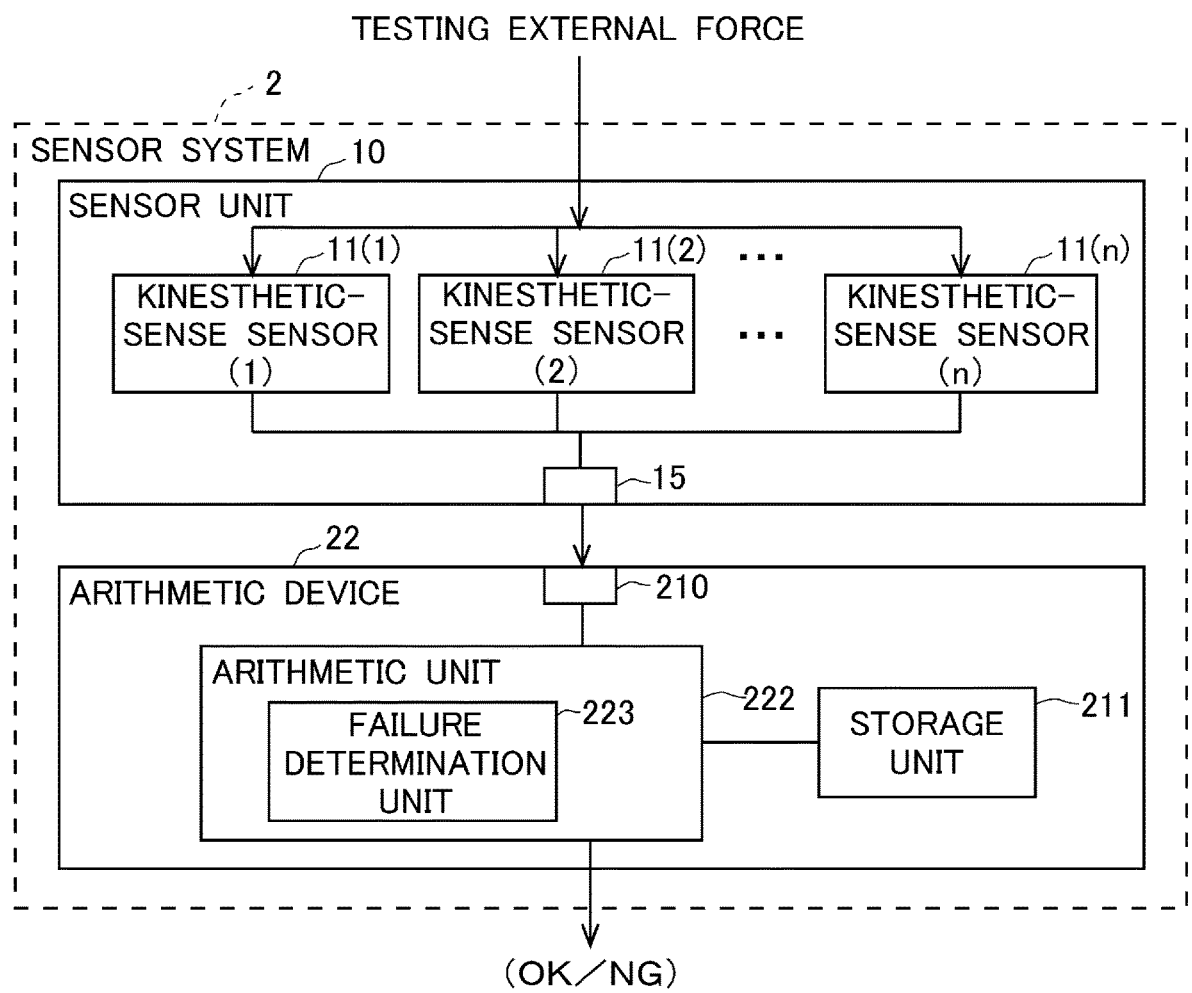
FIG. 18 is a functional block diagram of a sensor system according to a fourth embodiment.

Next, a fourth embodiment is described. The fourth embodiment differs from the third embodiment in the function of the arithmetic unit in the sensor unit. FIG. 18 is a functional block diagram of a sensor system according to the fourth embodiment. The sensor system 2 according to the fourth embodiment includes a sensor unit 10 and an arithmetic device 22. The configuration of the sensor unit 10 is similar to that described in the first embodiment. Therefore, its explanation is omitted here.

The configuration of the arithmetic device 22 differs from that in the first embodiment in that its arithmetic unit 222 includes a failure determination unit 223. The failure determination unit 223 determines whether or not a failure has occurred in kinesthetic-sense sensors included in the sensor unit 10 at a predetermined timing such as when the system is started up. The sensor system 2 has a predefined failure determination mode. Further, in the failure determination mode, the sensor unit 10 receives a predetermined testing load for determining whether there is a failure in the kinesthetic-sense sensors 11. The testing load is a load(s) by which a constant pressing force is applied to each of the kinesthetic-sense sensors 11 in a certain direction. For example, the testing load may be a predetermined load applied only in the z-axis direction. Alternatively, the testing load may be a predetermined load applied in the x-axis direction or in the y-axis direction. The failure determination unit 223 receives outputs of the sensor unit 10 through the sensor signal acquisition unit 210. The failure determination unit 223 compares the outputs of the kinesthetic-sense sensors 11 with each other. Then, the failure determination unit 223 outputs a result of the comparisons among the outputs of the kinesthetic-sense sensors 11.

The function of the failure determination unit 223 is described hereinafter together with its specific example. For example, when the sensor unit 10 has four kinesthetic-sense sensors 11, all the possible combinations of two kinesthetic-sense sensors among the four kinesthetic-sense sensors are extracted. Then, the failure determination unit 223 calculates a difference between outputs of two kinesthetic-sense sensors for each of the extracted combinations. Further, the failure determination unit 223 calculates whether or not the calculated difference is smaller than a predetermined threshold. Note that the threshold is stored in the storage unit 211 in advance. For example, when a pressing force in the x-axis direction is applied to the sensor unit as a testing load, the failure determination unit 223 performs the following calculations.

[Expression 14]

$$|f1x-f2x| < Th(fx) \quad (14a)$$

$$|f1x-f3x| < Th(fx) \quad (14b)$$

$$|f1x-f4x| < Th(fx) \quad (14c)$$

$$|f2x-f3x| < Th(fx) \quad (14d)$$

$$|f2x-f4x| < Th(fx) \quad (14e)$$

$$|f3x-f4x| < Th(fx) \quad (14f)$$

As a result of the above-shown calculations, for example, when Expressions (14a), (14d) and (14e) do not hold, the failure determination unit 223 determines that the kinesthetic-sense sensor 11(2) is faulty. Note that the failure determination unit 223 may simply output information about whether the result of the determination is OK or NG.

Figure 19:
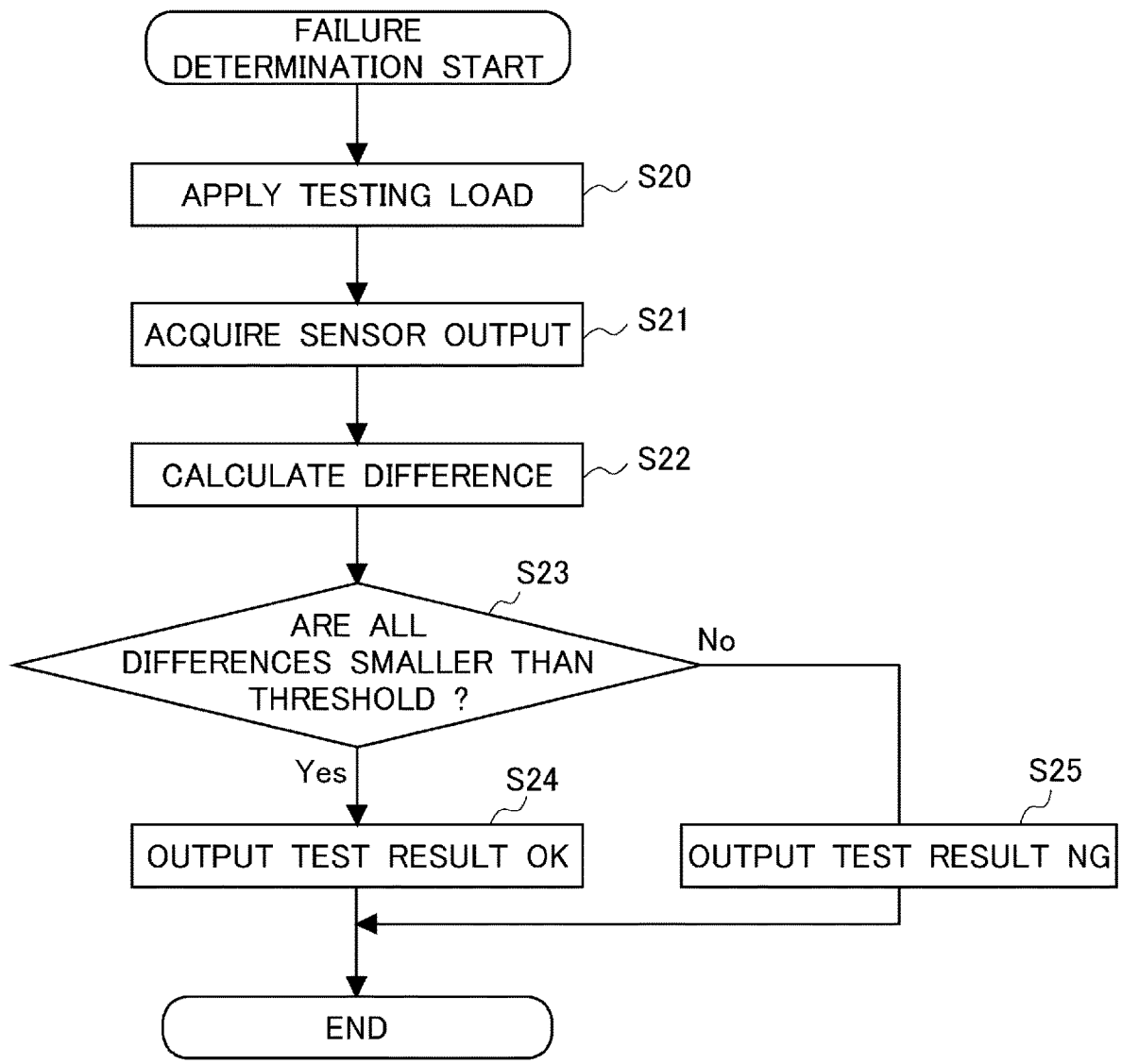
FIG. 19 is a flowchart showing processes performed by the sensor system according the fourth embodiment.

Next, processes performed by the sensor system 2 according to the fourth embodiment are described with reference to FIG. 19. FIG. 19 is a flowchart showing processes performed by the sensor system 2 according to the fourth embodiment. When a failure determination process is started, firstly, a testing load is applied to the sensor unit 10 (step S20). Next, the failure determination unit 223 acquires outputs of the sensor unit 10 (step S21). Next, the failure determination unit 223 extracts two outputs from among the acquired outputs of the sensor unit 10 and calculates a difference between these two outputs (step S22). Next, the failure determination unit 223 determines whether or not the calculated difference is smaller than a threshold (step S23). When all the calculated differences are smaller than the threshold (step S23: Yes), the failure determination unit 223 outputs a signal indicating that the test result is OK (step S24). On the other hand, when the failure determination unit 223 does not determine that all the calculated differences are smaller than the threshold, i.e., determines that at least one of the calculated differences is not smaller than the threshold (step S23: No), the failure determination unit 223 outputs a signal indicating that the test result is NG (step S25).

By adopting the configuration described above, the sensor system 2 can improve its reliability. Therefore, the fourth embodiment makes it possible to provide a sensor system including reliable six-axis sensor units, capable of reducing its size and thickness.

Note that the present disclosure is not limited to the above-described embodiments and they can be modified as desired without departing from the scope and spirit of the disclosure.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A sensor unit comprising:
    at least three kinesthetic-sense sensors arranged along a plane, each of the kinesthetic-sense sensors comprising a first force receiving part configured to receive an external force;
    a connecting member comprising a second force receiving part configured to receive an external force, the connecting member being configured to transfer the external force received by the second force receiving part to each of the first force receiving parts and connecting the first force receiving parts with each other; and
    an output unit configured to output signals corresponding to a pressing force in an orthogonal-axis direction orthogonal to the plane and pressing forces in two axial directions parallel to the plane, respectively, the pressing forces being components of divided forces of the external force received by the second force receiving part, received by the respective first force receiving parts through the connecting member, wherein the kinesthetic-sense sensors are capacitance-type sensors having a force receiving piece, the force receiving piece being supported by hinge beams extending from a plurality of seesaw parts that are rotatably supported by torsion beams extending in parallel to the plane and configured to follow and move when the first force receiving part receives the external force.

2. The sensor unit according to claim 1, wherein the connecting member can bend according to the divided forces received by the respective first force receiving parts.

3. The sensor unit according to claim 1, further comprising a connecting part connecting the connecting member with the first force receiving parts so that a relative angle between the connecting member and the first force receiving parts can be changed.

4. The sensor unit according to claim 1, wherein at least a part of the second force receiving part is disposed inside an outer edge formed by connecting the kinesthetic-sense sensors in the connecting member.

5. The sensor unit according to claim 1, wherein the force receiving part is formed in a central part of a silicon layer, and the plurality of seesaw parts are formed around the force receiving piece.

6. A sensor system comprising:
a sensor unit comprising:
at least three kinesthetic-sense sensors arranged along a plane, each of the kinesthetic-sense sensors comprising a first force receiving part configured to receive an external force;
a connecting member comprising a second force receiving part configured to receive an external force, the connecting member being configured to transfer the external force received by the second force receiving part to each of the first force receiving parts and connecting the first force receiving parts with each other; and
an output unit configured to output signals corresponding to a pressing force in an orthogonal-axis direction orthogonal to the plane and pressing forces in two axial directions parallel to the plane, respectively, the pressing forces being components of divided forces of the external force received by the second force receiving part, received by the respective first force receiving parts through the connecting member,
wherein the kinesthetic-sense sensors are capacitance-type sensors having a force receiving piece, the force receiving piece being supported by hinge beams extending from a plurality of seesaw parts that are rotatably supported by torsion beams extending in parallel to the plane and configured to follow and move when the first force receiving part receives the external force; and
an arithmetic device configured to output, as calculation results, a pressing force in an orthogonal-axis direction orthogonal to the plane, received by the second force receiving part, a moment around the orthogonal axial, two pressing forces in respective two axis directions parallel to the plane, and two moments around the respective two axes based on a value received from the output unit.

7. The sensor system according to claim 6, wherein the arithmetic device calculates the calculation results based on the value received from the output unit and a distance between the first force receiving part and the second force receiving part.

8. The sensor system according to claim 6, wherein the arithmetic device further comprises a failure determination unit configured to, when the second force receiving part receives a predetermined external force, compare values received from the output unit with each other and thereby determine whether or not any one of the kinesthetic-sense sensors is faulty.

9. A robot hand comprising:
a plurality of contact parts comprising contact surfaces configured to come into contact with an object;
a driving unit configured to move the plurality of contact parts toward each other so that the contact surfaces are opposed to each other; and
an output unit configured to, when the driving unit moves the plurality of contact parts toward each other and hence the robot hand grasps the object, output a tactile sense through the contact part, wherein
each contact part comprises a sensor unit comprising:
at least three kinesthetic-sense sensors arranged along a plane, each of the kinesthetic-sense sensors comprising a first force receiving part configured to receive an external force;
a connecting member comprising a second force receiving part configured to receive an external force, the connecting member being configured to transfer the external force received by the second force receiving part to each of the first force receiving parts and connecting the first force receiving parts with each other; and
an output unit configured to output signals corresponding to a pressing force in an orthogonal-axis direction orthogonal to the plane and pressing forces in two axial directions parallel to the plane, respectively, the pressing forces being components of divided forces of the external force received by the second force receiving part, received by the respective first force receiving parts through the connecting member,
wherein the kinesthetic-sense sensors are capacitance-type sensors having a force receiving piece, the force receiving piece being supported by hinge beams extending from a plurality of seesaw parts that are rotatably supported by torsion beams extending in parallel to the plane and configured to follow and move when the first force receiving part receives the external force.

10. A robot arm comprising:
an arm part comprising at least one joint; and
a robot hand comprising:
a plurality of contact parts comprising contact surfaces configured to come into contact with an object;
a driving unit configured to move the plurality of contact parts toward each other so that the contact surfaces are opposed to each other; and
an output unit configured to, when the driving unit moves the plurality of contact parts toward each other and hence the robot hand grasps the object, output a tactile sense through the contact part, wherein
each contact part comprises a sensor unit comprising:
at least three kinesthetic-sense sensors arranged along a plane, each of the kinesthetic-sense sensors comprising a first force receiving part configured to receive an external force;
a connecting member comprising a second force receiving part configured to receive an external force, the connecting member being configured to transfer the external force received by the second force receiving part to each of the first force receiving parts and connecting the first force receiving parts with each other; and an output unit configured to output signals corresponding to a pressing force in an orthogonal-axis direction orthogonal to the plane and pressing forces in two axial directions parallel to the plane, respectively, the pressing forces being components of divided forces of the external force received by the second force receiving part, received by the respective first force receiving parts through the connecting member, wherein the kinesthetic-sense sensors are capacitance-type sensors having a force receiving piece, the force receiving piece being supported by hinge beams extending from a plurality of seesaw parts that are rotatably supported by torsion beams extending in parallel to the plane and configured to follow and move when the first force receiving part receives the external force, wherein the robot hand is disposed at a tip of the arm part.

11. A server device comprising:

a sensor information acquisition unit configured to acquire a value output by a sensor unit comprising:

at least three kinesthetic-sense sensors arranged along a plane, each of the kinesthetic-sense sensors comprising a first force receiving part configured to receive an external force;

a connecting member comprising a second force receiving part configured to receive an external force, the connecting member being configured to transfer the external force received by the second force receiving part to each of the first force receiving parts and connecting the first force receiving parts with each other; and an output unit configured to output signals corresponding to a pressing force in an orthogonal-axis direction orthogonal to the plane and pressing forces in two axial directions parallel to the plane, respectively, the pressing forces being components of divided forces of the external force received by the second force receiving part, received by the respective first force receiving parts through the connecting member, wherein the kinesthetic-sense sensors are capacitance-type sensors having a force receiving piece, the force receiving piece being supported by hinge beams extending from a plurality of seesaw parts that are rotatably supported by torsion beams extending in parallel to the plane and configured to follow and move when the first force receiving part receives the external force; and an arithmetic device configured to output, as calculation results, a pressing force in an orthogonal-axis direction orthogonal to the plane, received by the second force receiving part of the sensor unit, a moment around the orthogonal axial, two pressing forces in respective two axis directions parallel to the plane, and two moments around the respective two axes based on the value acquired by the sensor information acquisition unit.

12. A calculation method comprising:

acquiring a value output by a sensor unit comprising:

at least three kinesthetic-sense sensors arranged along a plane, each of the kinesthetic-sense sensors comprising a first force receiving part configured to receive an external force;

a connecting member comprising a second force receiving part configured to receive an external force, the connecting member being configured to transfer the external force received by the second force receiving part to each of the first force receiving parts and connecting the first force receiving parts with each other; and an output unit configured to output signals corresponding to a pressing force in an orthogonal-axis direction orthogonal to the plane and pressing forces in two axial directions parallel to the plane, respectively, the pressing forces being components of divided forces of the external force received by the second force receiving part, received by the respective first force receiving parts through the connecting member, wherein the kinesthetic-sense sensors are capacitance-type sensors having a force receiving piece, the force receiving piece being supported by hinge beams extending from a plurality of seesaw parts that are rotatably supported by torsion beams extending in parallel to the plane and configured to follow and move when the first force receiving part receives the external force;

storing a distance and a relative positional relation between the first force receiving part and the second force receiving part related to the sensor unit; and outputting, as calculation results, a pressing force in an orthogonal-axis direction orthogonal to the plane, received by the second force receiving part of the sensor unit, a moment around the orthogonal axial, two pressing forces in respective two axis directions parallel to the plane, and two moments around the respective two axes based on the value acquired from the sensor unit and the distance and the relative positional relation between the first force receiving part and the second force receiving part.

13. A non-transitory computer readable medium storing a program for causing a compute to perform a calculation method comprising:

acquiring a value output by a sensor unit comprising:

at least three kinesthetic-sense sensors arranged along a plane, each of the kinesthetic-sense sensors comprising a first force receiving part configured to receive an external force;

a connecting member comprising a second force receiving part configured to receive an external force, the connecting member being configured to transfer the external force received by the second force receiving part to each of the first force receiving parts and connecting the first force receiving parts with each other; and an output unit configured to output signals corresponding to a pressing force in an orthogonal-axis direction orthogonal to the plane and pressing forces in two axial directions parallel to the plane, respectively, the pressing forces being components of divided forces of the external force received by the second force receiving part, received by the respective first force receiving parts through the connecting member, wherein the kinesthetic-sense sensors are capacitance-type sensors having a force receiving piece, the force receiving piece being supported by hinge beams extending from a plurality of seesaw parts that are rotatably supported by torsion beams extending in parallel to the plane and configured to follow and move when the first force receiving part receives the external force;

storing a distance and a relative positional relation between the first force receiving part and the second force receiving part related to the sensor unit; and outputting, as calculation results, a pressing force in an orthogonal-axis direction orthogonal to the plane, received by the second force receiving part of the sensor unit, a moment around the orthogonal axial, two pressing forces in respective two axis directions parallel to the plane, and two moments around the respective two axes based on the value acquired from the sensor unit and the distance and the relative positional relation between the first force receiving part and the second force receiving part.

\* \* \* \* \*